(12) United States Patent
Mimura

(10) Patent No.: US 11,325,463 B2
(45) Date of Patent: May 10, 2022

(54) LOCK DEVICE OF FUEL TANK CAP

(71) Applicant: ASAHI DENSO CO., LTD., Hamamatsu (JP)

(72) Inventor: Yohei Mimura, Hamamatsu (JP)

(73) Assignee: ASAHI DENSO CO., LTD., Shizuoka (JP)

( * ) Notice: Subject to any disclaimer, the term of this patent is extended or adjusted under 35 U.S.C. 154(b) by 0 days.

(21) Appl. No.: 17/130,319

(22) Filed: Dec. 22, 2020

(65) Prior Publication Data

US 2021/0197661 A1 Jul. 1, 2021

(30) Foreign Application Priority Data

Dec. 25, 2019 (JP) .............................. JP2019-233857

(51) Int. Cl.
*B60K 15/05* (2006.01)
*B60K 15/04* (2006.01)

(52) U.S. Cl.
CPC .. *B60K 15/0409* (2013.01); *B60K 2015/0416* (2013.01); *B60K 2015/0445* (2013.01);
(Continued)

(58) Field of Classification Search
CPC .... B60K 15/0409; B60K 15/04; B60K 15/05; B60K 2015/0416; B60K 2015/0445; B60K 2015/0451; B60K 2015/0454; B60K 2015/0584; B60K 2015/0496; B60Y 2200/12

See application file for complete search history.

(56) References Cited

U.S. PATENT DOCUMENTS 3,915,491 A * 10/1975 Montgomery ......... B60K 15/05
296/97.22
7,331,616 B2 * 2/2008 Brei .................... E05B 47/0009
292/100

(Continued)

FOREIGN PATENT DOCUMENTS

DE 10-2017-004447 A1 3/2018
IT 1393382 B1 4/2012
(Continued)

OTHER PUBLICATIONS

Extended European Search Report issued in Patent Application No. EP 20 21 6064 dated Jun. 1, 2021.

*Primary Examiner* — Nicolas A Arnett
(74) *Attorney, Agent, or Firm* — Pearne & Gordon LLP

(57) ABSTRACT

A lock device of a fuel tank cap includes: a cap configured to open and close a fuel filler port; an operating unit; a fastening unit movable in conjunction with an operation of the operating unit; a lock unit configured to lock movement of the fastening unit from a fastening position to a allowing position; and a detection switch configured to detect start of the movement of the fastening unit accompanying the operation of the operating unit. The fastening unit includes: a first fastening unit of which the start of movement can be detected by the detection switch; and a second fastening unit which enables locking by the lock unit and which is integrally moved with the first fastening unit after the first fastening unit is moved by a predetermined dimension so that the second fastening unit can be moved from the fastening position to the allowing position.

5 Claims, 21 Drawing Sheets

(52) U.S. Cl.
CPC ............ *B60K 2015/0451* (2013.01); *B60K 2015/0454* (2013.01); *B60K 2015/0584* (2013.01)

(56) References Cited

U.S. PATENT DOCUMENTS

| | | | |
|---|---|---|---|
| 7,377,559 B2 * | 5/2008 | Gramss | B60K 15/05 220/211 |
| 8,845,001 B2 * | 9/2014 | Kotama | B60K 1/04 296/97.22 |
| 10,882,394 B2 * | 1/2021 | Husberg | E05B 81/20 |
| 2010/0156118 A1 | 6/2010 | Codeluppi et al. | |
| 2016/0108648 A1 * | 4/2016 | Nam | E05B 17/0037 292/142 |
| 2016/0375761 A1 * | 12/2016 | Horikawa | E05F 15/622 49/276 |

FOREIGN PATENT DOCUMENTS

| | | |
|---|---|---|
| JP | H09-71275 A | 3/1997 |
| JP | 2005-075308 A | 3/2005 |
| JP | 2017-196951 A | 11/2017 |

\* cited by examiner

LOCK DEVICE OF FUEL TANK CAP

CROSS-REFERENCE TO RELATED APPLICATIONS

The present application claims the benefit of priority of Japanese Patent Application No. 2019-233857, filed on Dec. 25, 2019, the content of which is incorporated herein by reference.

TECHNICAL FIELD

The present invention relates to a lock device of a fuel tank cap for locking or unlocking an opening and closing of a cap for blocking a fuel filler port connected to a fuel tank.

BACKGROUND ART

Normally, a fuel filler port is provided at a top of a fuel tank in a large motorcycle, and a lock device for a fuel tank cap including a cap which can open and close the fuel filler port by moving between a closed position where the fuel filler port is blocked and an open position where the fuel filler port is open and a lock unit to lock or unlock the opening and closing of the cap has been proposed. For example, as disclosed in Italian Patent No. 1393382, as a lock device of a fuel tank cap of the related art, a lock device including an operation knob which can swing around a swing shaft by an operator, a fastening unit which can be moved in conjunction with the swing operation of the operation knob and moves between a fastening position where a cap blocking a fuel filler port is held and an allowing position where the fastening is released and an opening movement of the cap is allowed, a lock unit which can lock movement of the fastening unit from the fastening position to the allowing position, or release the lock to allow movement of the fastening unit from the fastening position to the allowing position, and a detection switch which can detect the start of movement of the fastening unit accompanying an operation of an operating unit can be exemplified.

However, in the related art described above, the lock by the lock unit is released on condition that the detection switch detects that the fastening unit starts to move by operating the operating unit (operation knob). Therefore, when the operation of the operating unit is performed extremely quickly, there is a risk that the time from detection of the detection switch until unlocking by the lock unit is extremely short to unlock in time, making it difficult to open the cap smoothly.

SUMMARY

The invention is made in view of such circumstances and an object thereof is to provide a lock device of a fuel tank cap which can secure a sufficient time from detection of the start of movement of a fastening unit by a detection switch until unlocking by a lock unit and can improve an operability by an operating unit.

According to an aspect of the invention, there is provided a lock device of a fuel tank cap including: a cap configured to open and close a fuel filler port by moving between a closed position where the fuel filler port leading to a fuel tank of a vehicle is blocked and an open position where the fuel filler port is open; an operating unit configured to be operated by an operator; a fastening unit movable in conjunction with an operation of the operating unit, the fastening unit configured to move between a fastening position where the cap blocking the fuel filler port is held and an allowing position where the fastening is released to allow the cap to open; a lock unit configured to lock movement of the fastening unit from the fastening position to the allowing position or release the lock to allow the movement of the fastening unit from the fastening position to the allowing position; and a detection switch configured to detect start of the movement of the fastening unit accompanying the operation of the operating unit, where: the lock device performs unlocking by the lock unit on condition that the detection switch detects the start of the movement of the fastening unit; and the fastening unit includes: a first fastening unit which moves by receiving an operating force of the operating unit and of which the start of movement can be detected by the detection switch; and a second fastening unit which enables locking by the lock unit and which is integrally moved with the first fastening unit after the first fastening unit is moved by a predetermined dimension so that the second fastening unit can be moved from the fastening position to the allowing position.

BRIEF DESCRIPTION OF THE DRAWINGS

FIG. 2A is a schematic view illustrating a state in which the cap is in a closed position and FIG. 2B is a schematic view illustrating a state in which the cap is in an open position;

DESCRIPTION OF EMBODIMENTS

Hereinafter, embodiments of the invention will be specifically described with reference to the drawings.

Figure 1:
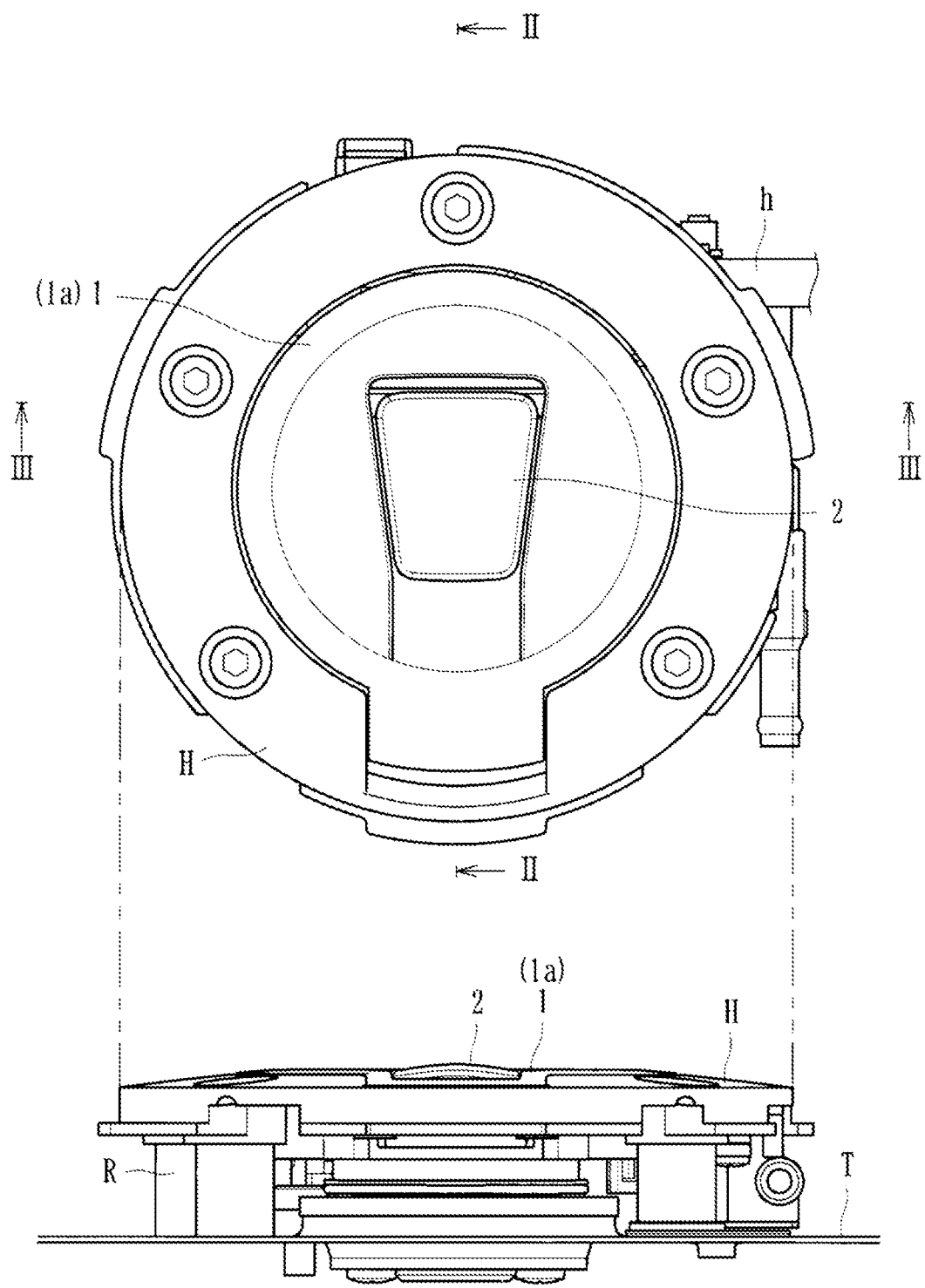
FIG. 1 is a plan view and a side view illustrating a lock device of a fuel tank cap according to a first embodiment of the invention.
Figure 2A:
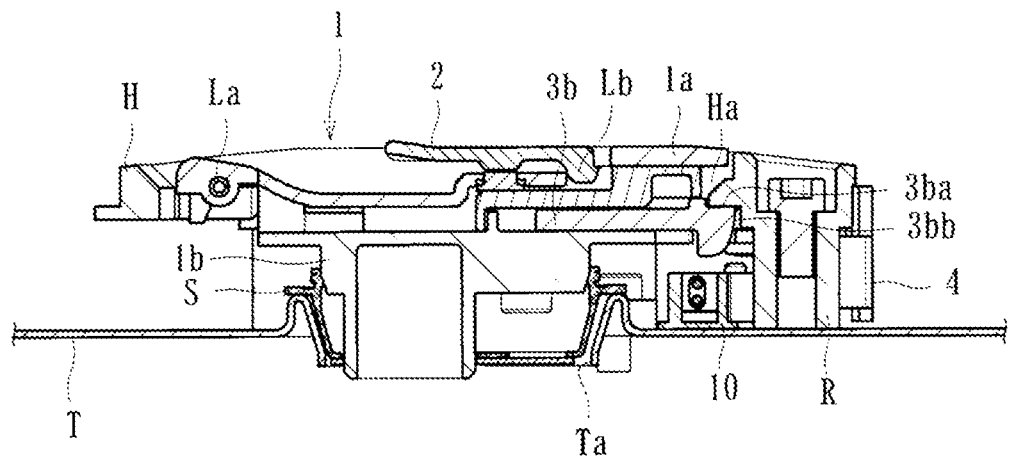
FIGS. 2A and 2B are cross-sectional views taken along the line II-II in FIG. 1, where
Figure 2B:
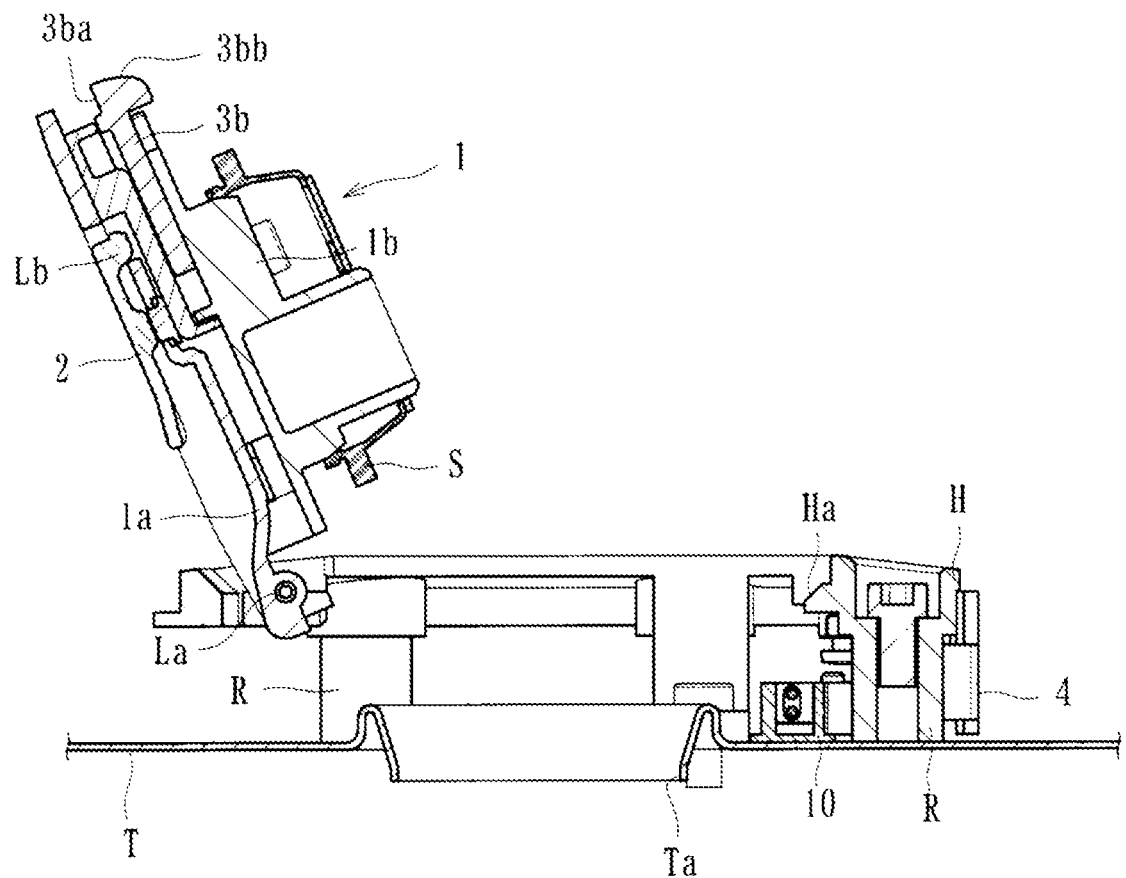
Figure 3:
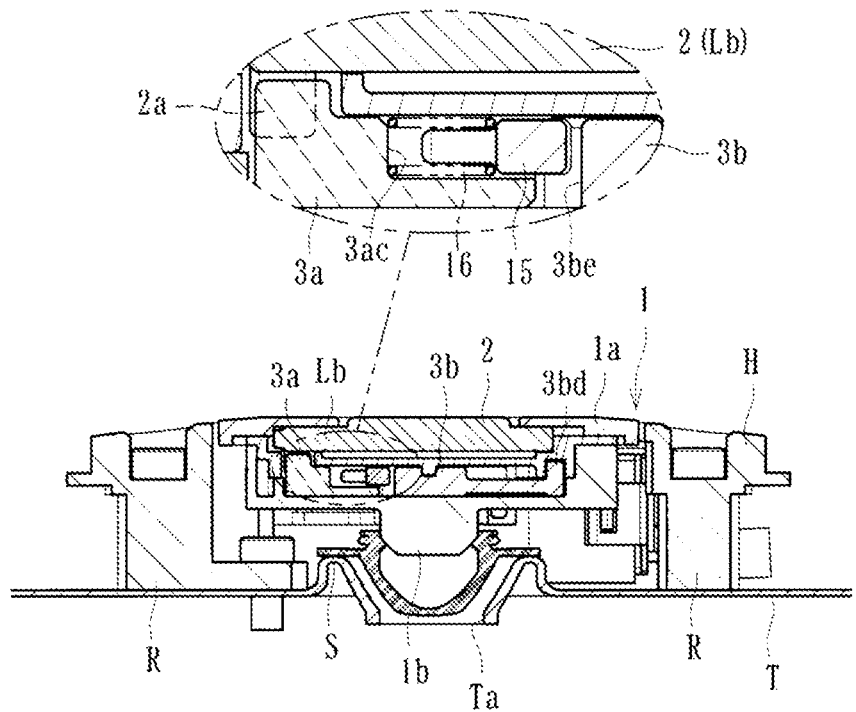
FIG. 3 is a cross-sectional view taken along the line III-III in FIG. 1.

A lock device of a fuel tank cap according to a first embodiment locks or unlocks an opening and closing of a cap for closing a fuel filler port connected to a fuel tank in a large two-wheeled vehicle. As illustrated in FIGS. 1 to 3, the lock device is configured to include a cap 1, an operation knob 2 (operating unit), a fastening unit 3, a solenoid 5 as lock unit, a slider 6, and a detection switch 8. The components described above are accommodated in a main body R fixed to a fuel tank T including a fuel filler port Ta. As illustrated in FIGS. 1 to 3, an annular cover portion H is fixed to an upper portion of the main body R by a plurality of bolts.

The cap 1 can open or close the fuel filler port Ta by moving between a closed position (see FIG. 2A) where the fuel filler port Ta connected to the fuel tank of a vehicle is closed and an open position (see FIG. 2B) where the fuel filler port Ta is opened. The cap 1 is composed of an upper cap portion 1a and a lower cap portion 1b. In the embodiment, an operator such as a driver picks the operation knob 2 by hand and pulls the operation knob 2 upward such that the cap 1 swings around a swing shaft La and moves from the closed position to the open position so that the fuel filler port Ta can face the outside.

Figure 4:
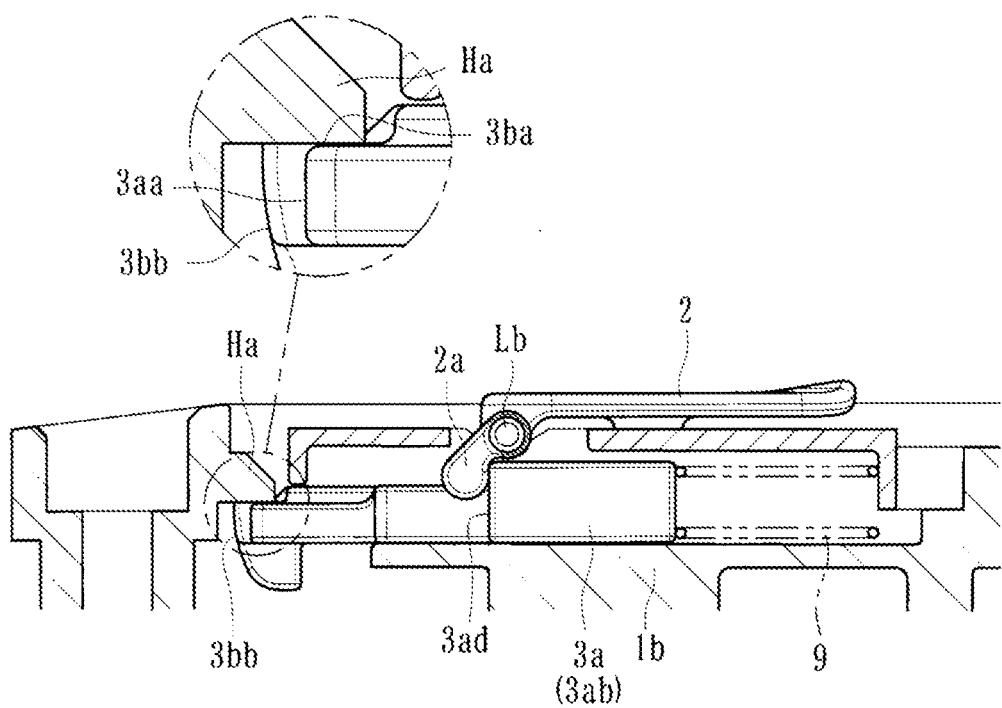
FIG. 4 is a schematic view illustrating a state (a state in which a fastening unit is in a fastening position) before operation of an operating unit in the lock device of the fuel tank cap.
Figure 5:
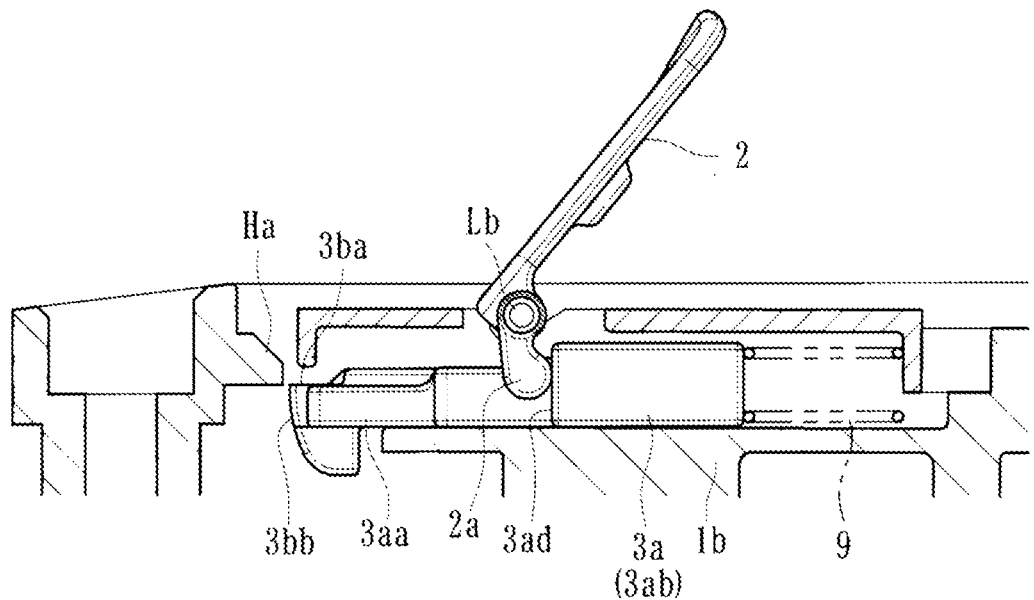
FIG. 5 is a schematic view illustrating a state (a state in which the fastening unit is in an allowing position) after operation of the operating unit in the lock device of the fuel tank cap.
Figure 6:
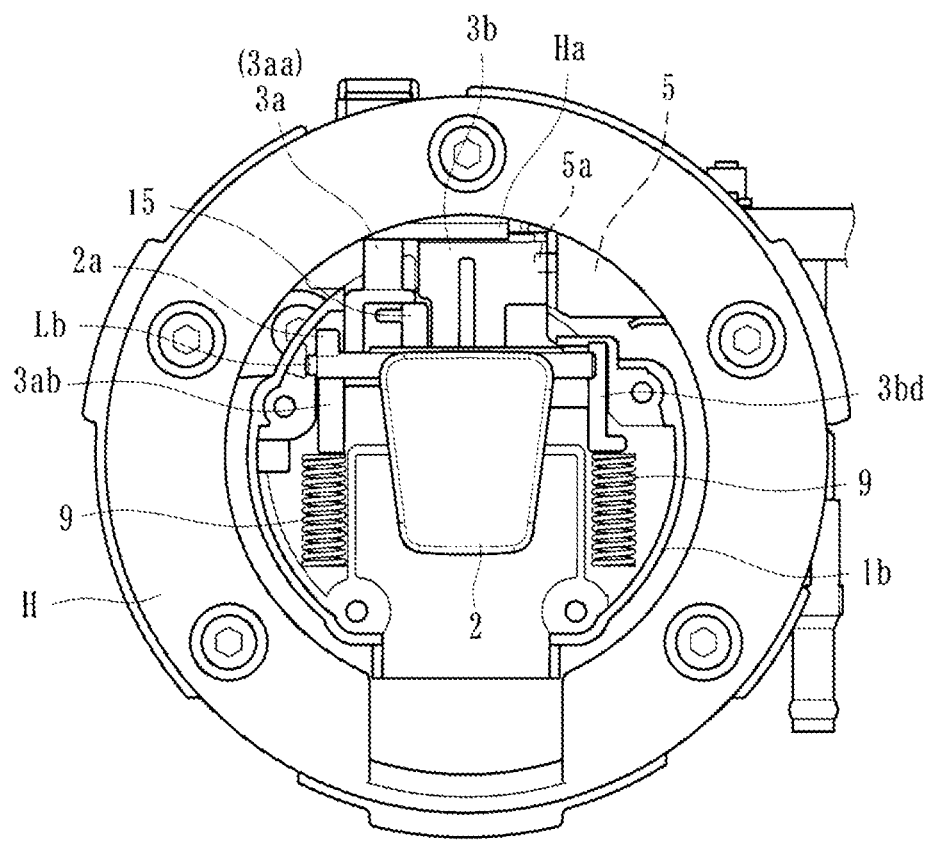
FIG. 6 is a plan view illustrating a state in which a cap is removed in the lock device for the fuel tank cap as viewed from above.
Figure 7:
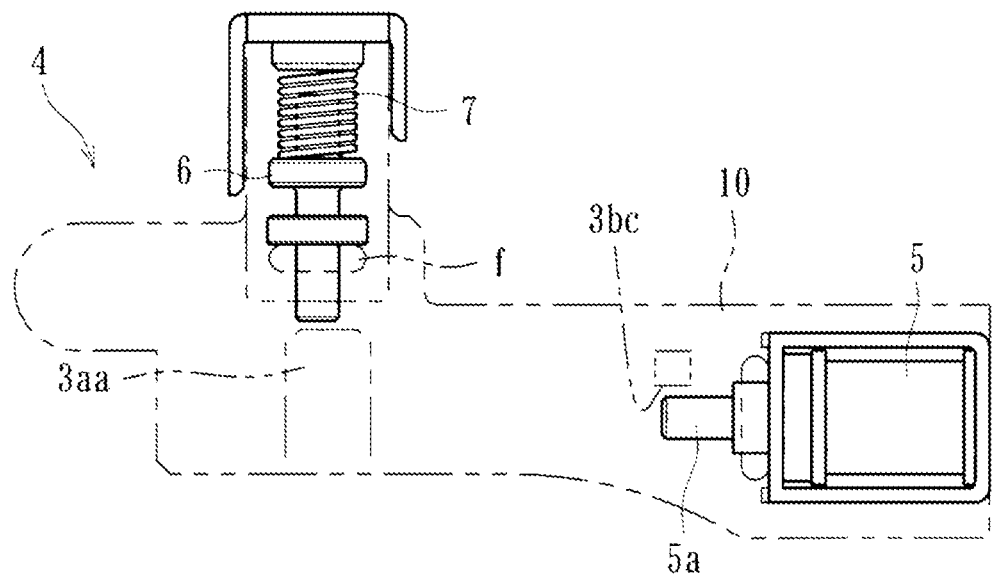
FIG. 7 is a schematic view illustrating a positional relationship between a solenoid and a slider with respect to the fastening unit in the lock device of the fuel tank cap.
Figure 8:
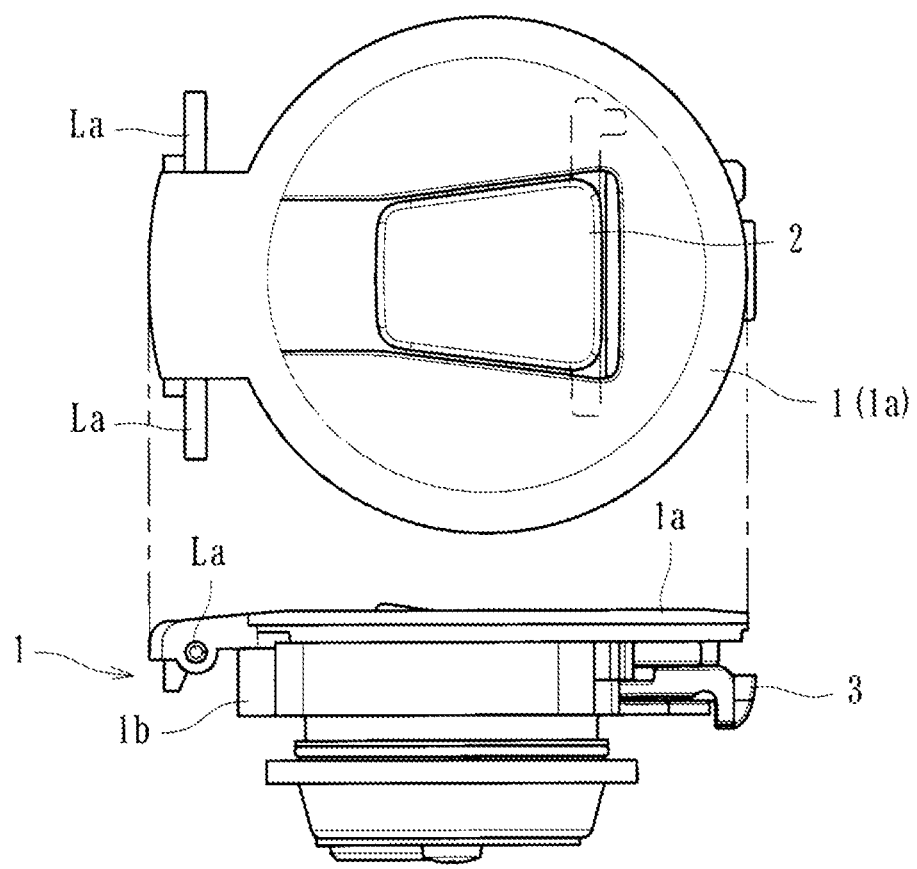
FIG. 8 is a plan view and a side view illustrating a cap in the lock device of the fuel tank cap.

As illustrated in FIG. 8, the upper cap portion 1a is formed with the swing shaft La which swings the cap 1 between the closed position and the open position at a predetermined position. The upper cap portion 1a holds the operation knob 2 (operating unit) to be swingable at the upper portion thereof. The lower cap portion 1b is attached with a sealing material S which seals the fuel filler port Ta when the cap 1 is in the closed position, and as illustrated in FIGS. 4 to 6, the lower cap portion 1b is configured to accommodate the fastening unit 3 in a movable state between a fastening position and an allowing position.

Figure 9:
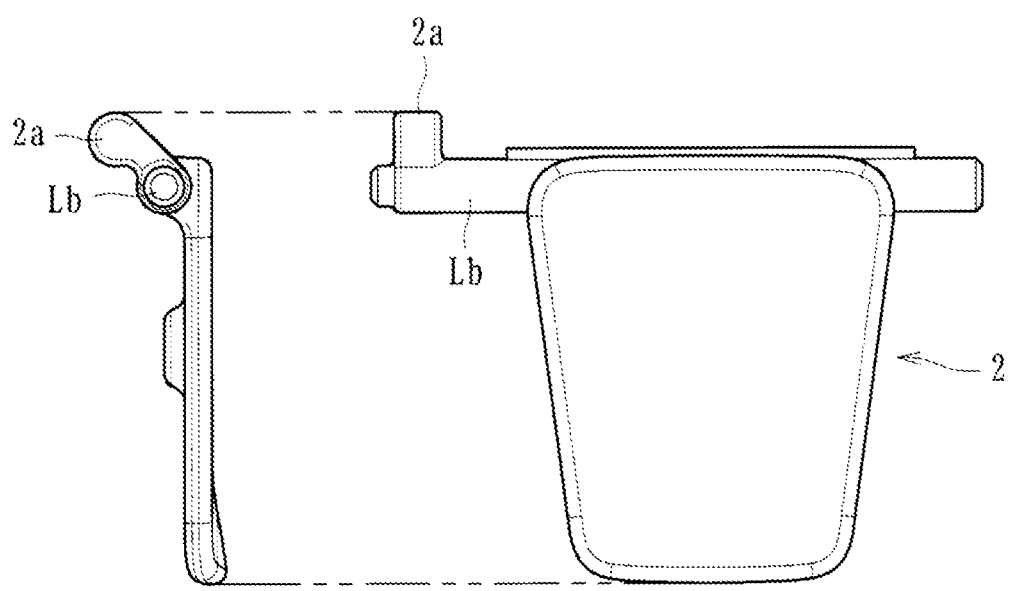
FIG. 9 is a plan view and a side view illustrating the operating unit in the lock device of the fuel tank cap.

As illustrated in FIG. 9, the operation knob 2 (operating unit) has the swing shaft Lb integrally formed thereof. Protruding portions 2a are formed at both ends of the swing shaft Lb and are attached to recesses formed on an upper surface of the cap 1 (upper cap portion 1a). Then, when an operator pulls up and operates the operation knob 2, the operation knob 2 can be swung around the swing shaft Lb.

The fastening unit 3 can be moved in conjunction with the operation of the operation knob 2 and the fastening unit 3 moves between a fastening position (see FIG. 4) where the cap 1 blocking the fuel filler port Ta is held and an allowing position (see FIG. 5) which releases the fastening and allows the opening movement of the cap 1. More specifically, the fastening unit 3 according to the embodiment is slidable substantially linearly in a working space (see FIG. 6) in the lower cap portion 1b. The fastening unit 3 is configured as follows. When the fastening unit 3 is in the fastening position, as illustrated in FIG. 4, a fastening portion 3ba (the portion formed in a second fastening unit 3b described below) at the tip is fastened to a fastened portion Ha formed in the cover portion H to restrict the movement of the cap 1 from the closed position to the open position. When the operation knob 2 is operated and the fastening unit 3 is in the allowing position, as illustrated in FIG. 5, the fastening portion 3ba is separated from the fastened portion Ha and the fastening is released, allowing the cap 1 to move from the closed position to the open position.

Figure 10:
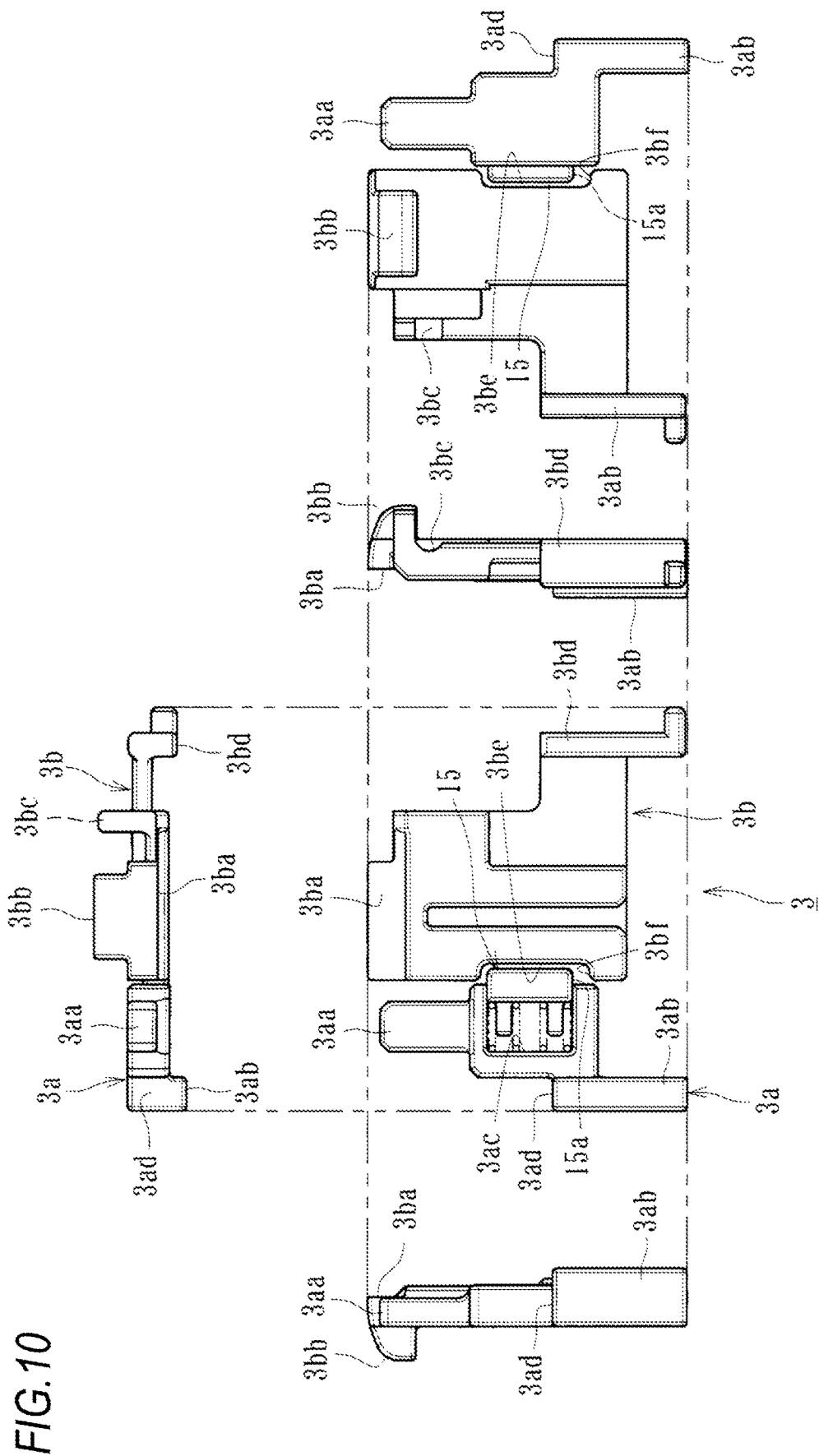
FIG. 10 is a five-side view illustrating the fastening unit (a state in which a first fastening unit and a second fastening unit are integrated) in the lock device of the fuel tank cap.
Figure 11:
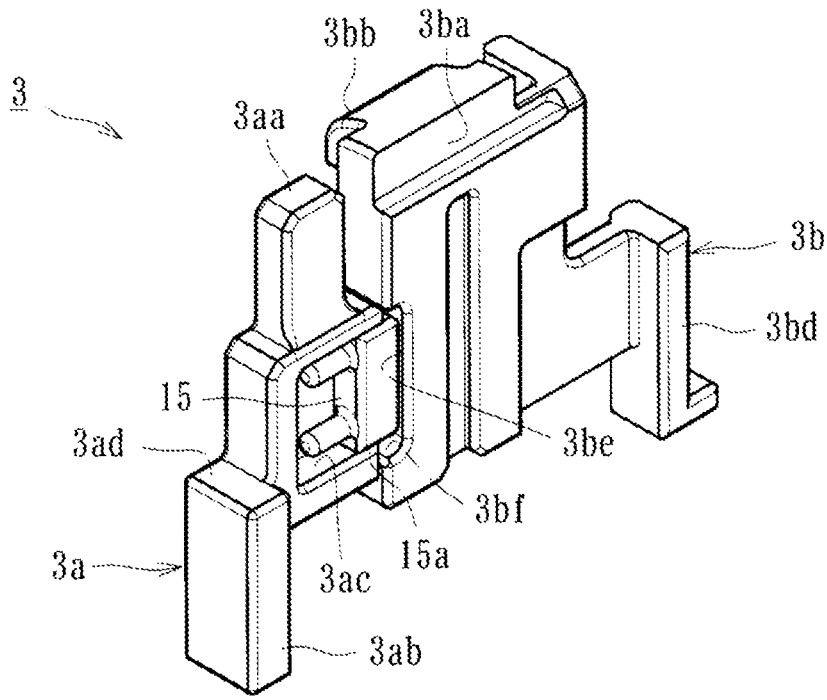
FIG. 11 is a perspective view illustrating the fastening unit (a state in which the first fastening unit and the second fastening unit are integrated)
Figure 12:
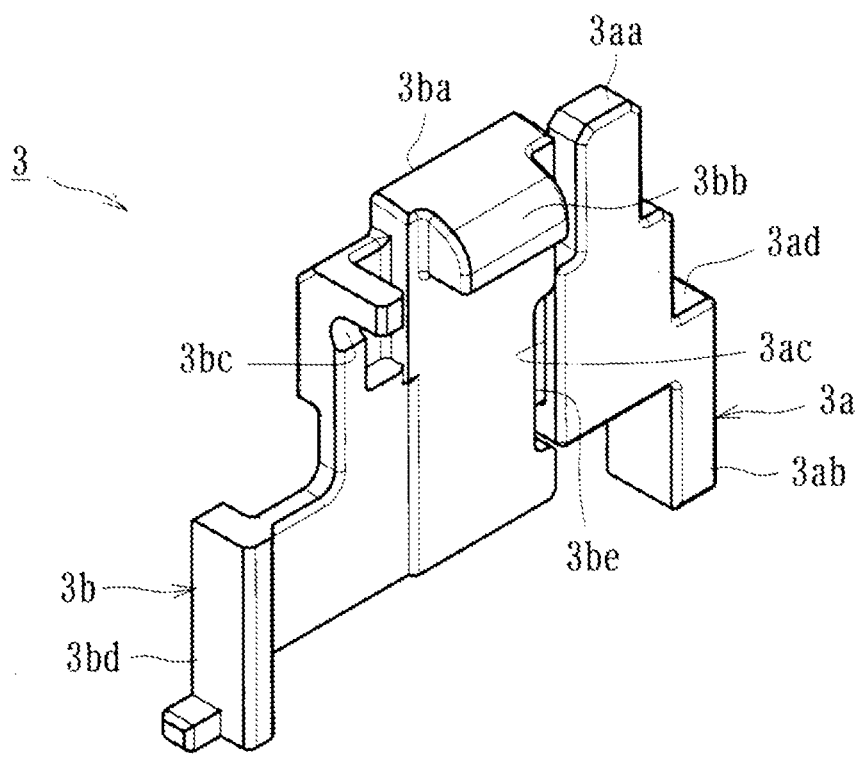
FIG. 12 is a perspective view illustrating the fastening unit (a state in which the first fastening unit and the second fastening unit are integrated)

Here, the fastening unit 3 according to the embodiment includes a first fastening unit 3a and the second fastening unit 3b, as illustrated in FIGS. 10 to 12. The first fastening unit 3a and the second fastening unit 3b consist of separate members. The first fastening unit 3a and the second fastening unit 3b can be moved integrally, or the first fastening unit 3a can be moved separately with respect to the second fastening unit 3b. As illustrated in FIGS. 4 and 5, the first fastening unit 3a and the second fastening unit 3b are urged from the allowing position toward the fastening position by urging forces of coil springs 9.

The first fastening unit 3a moves by receiving the operating force of the operation knob 2 (operating unit) and the start of movement thereof can be detected by the detection switch 8. As illustrated in FIG. 17, the first fastening unit 3a includes an abutment portion 3aa, an extension portion 3ab, an accommodation recess portion 3ac, a receiving portion 3ad, and an overload prevention portion 15. The abutment portion 3aa is composed of a portion formed at the tip portion of the first fastening unit 3a. As illustrated in FIGS. 13 to 16, depending on the movement of the first fastening unit 3a, the abutment portion 3aa can be brought into contact with or separated from the protruding portion 6a of the slider 6.

The extension portion 3ab is composed of a portion formed at a base end portion of the first fastening unit 3a and is capable of abutting on one end of the coil spring 9 described above. As illustrated in FIGS. 4 and 5, the receiving portion 3ad located between the abutment portion 3aa and the extension portion 3ab is in contact with the protruding portion 2a of the operation knob 2. When the operation knob 2 swings around the swing shaft Lb, the receiving portion 3ad is pressed by the protruding portion 2a in response to the operating force, and the first fastening unit 3a can be moved.

Figure 19:
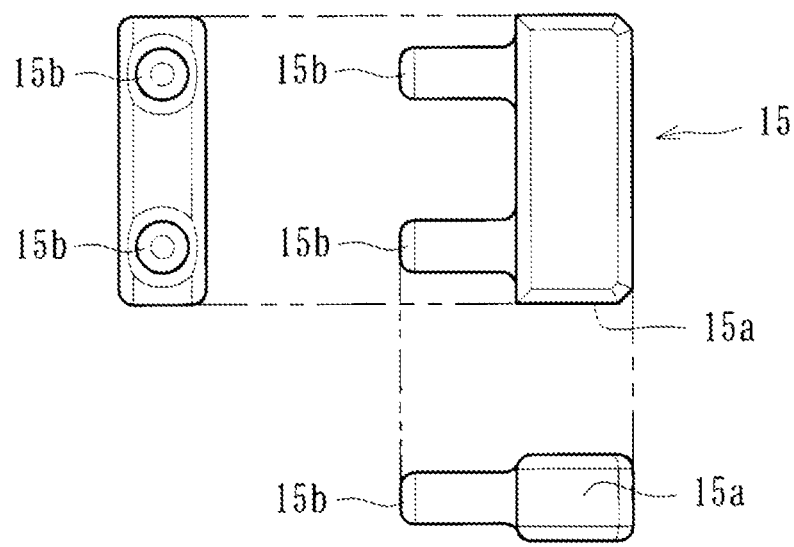
FIG. 19 is a three-side view illustrating an overload prevention unit in the lock device of the fuel tank cap.
Figure 20:
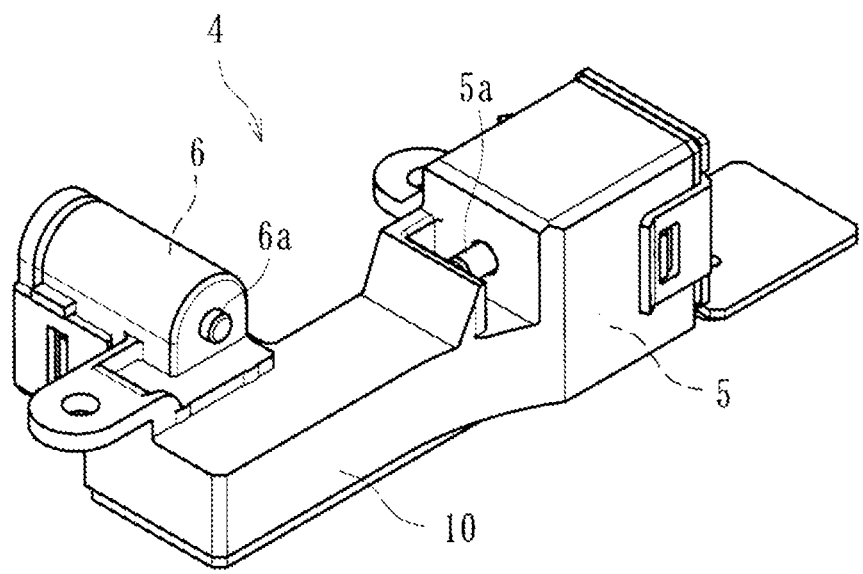
FIG. 20 is a perspective view illustrating a unit having the solenoid and the slider in the lock device of the fuel tank cap.
Figure 21:
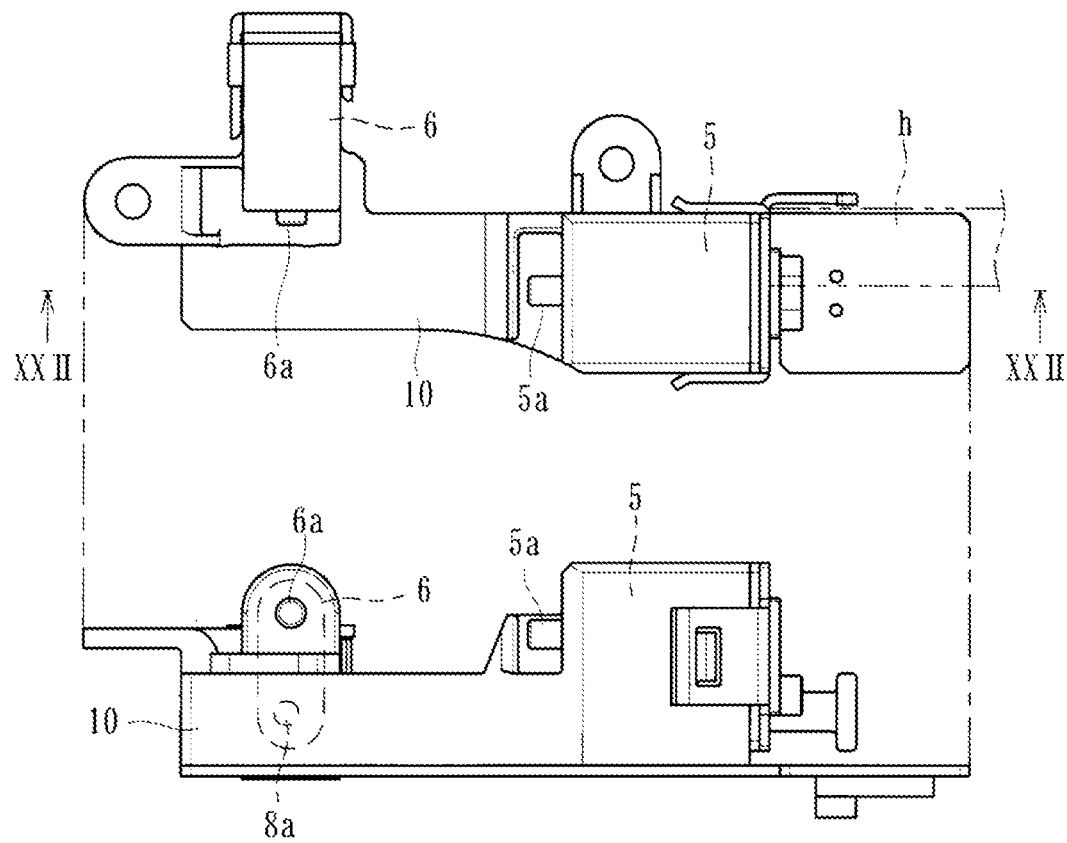
FIG. 21 is a plan view and a side view illustrating the unit.
Figure 22:
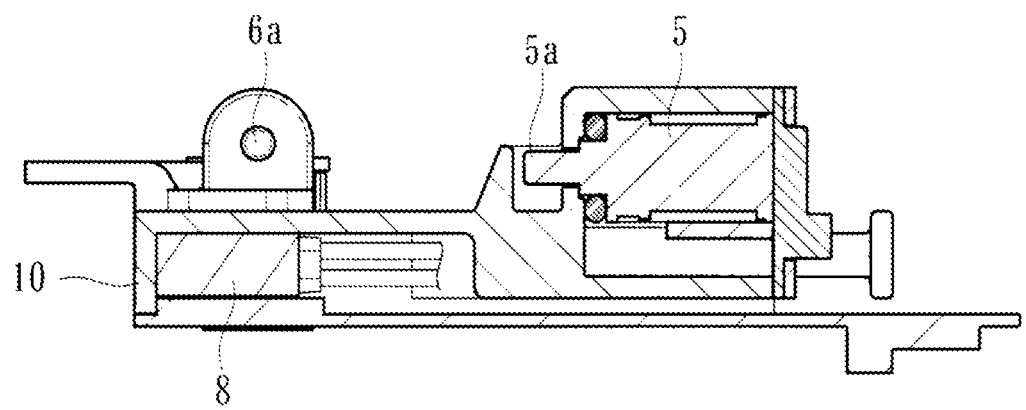
FIG. 22 is a cross-sectional view taken along the line XXII-XXII in FIG. 21.

The accommodation recess portion 3ac has a concave shape capable of movably accommodating the overload prevention portion 15. The overload prevention unit 15 is for releasing load when a predetermined load or more is generated in the process of integrally moving the first fastening unit 3a and the second fastening unit 3b. As illustrated in FIG. 19, the overload prevention portion 15 is composed of a separate member including a first abutment surface 15a and a spring receiving portion 15b. Then, as illustrated in FIGS. 10 and 11, the overload prevention portion 15 is accommodated in the accommodating recess 3ac via the coil spring 16. The first fastening unit 3a and the second fastening unit 3b are assembled so that the overload prevention portion 15 can slide in a notch portion 3be of the second fastening unit 3b.

Figure 18:
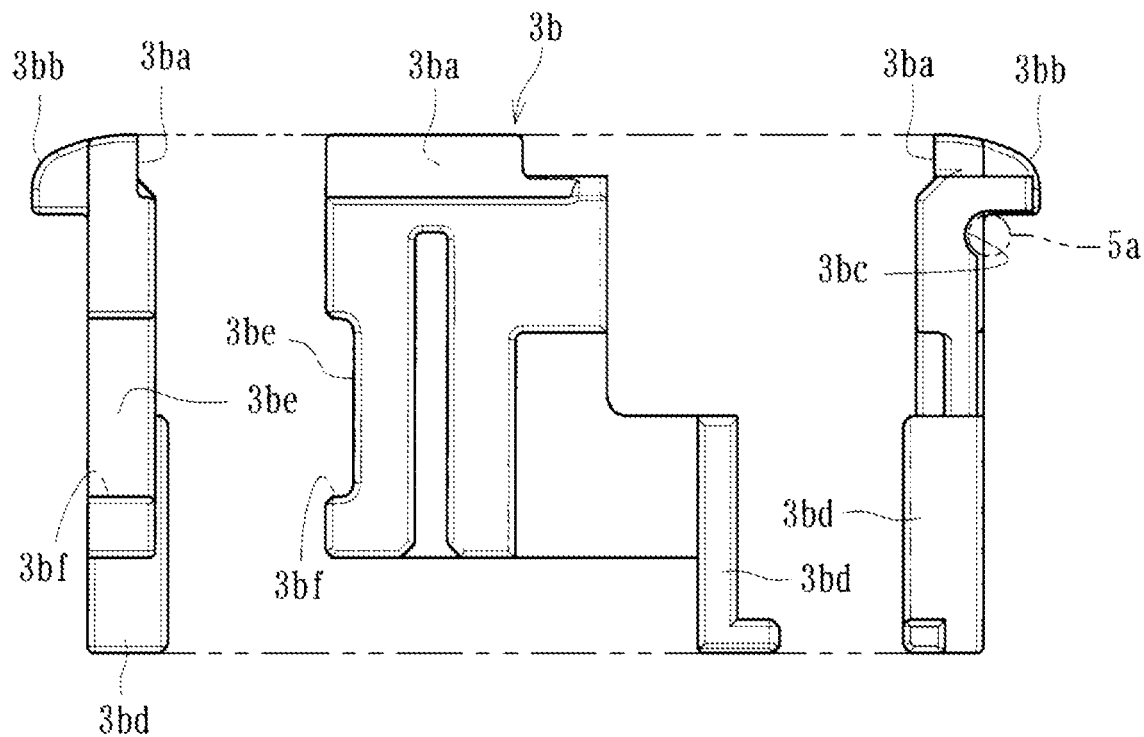
FIG. 18 is a three-side view illustrating the second fastening unit in the lock device of the fuel tank cap.

The second fastening unit 3b can be locked by the solenoid 5 (lock unit). The second fastening unit 3b is configured such that after the first fastening unit 3a moves by a predetermined dimension, the second fastening unit 3b moves integrally with the first fastening unit 3a so that the second fastening unit 3b can move from the fastening position to the allowing position. As illustrated in FIG. 18, the second fastening unit 3b is configured to include a fastening portion 3ba, a tapered surface 3bb, an interfered portion 3bc, an extension portion 3bd, a notch portion 3be, and a second abutment surface 3bf.

As described above, the fastening portion 3ba is composed of a portion which restricts the movement of the cap 1 from the closed position to the open position by fastening with respect to the fastened portion Ha and the tapered surface 3bb is formed on the back surface side thereof. Then, when the cap 1 is swung from the open position to the closed position, the tapered surface 3bb interferes with the fastened portion Ha of the cover portion H and the second fastening unit 3b moves slightly in a direction toward the allowing position against the urging force of the coil spring 9. As such, when the second fastening unit 3b moves and reaches a position where the tapered surface 3bb no longer interferes with the fastened portion Ha, since the cap 1 swings to the closed position and the second fastening unit 3b moves to the fastening position by the urging force of the coil spring 9, the fastening portion 3ba is fastened to the fastened portion Ha.

The interfered portion 3bc is composed of a portion formed on the back surface of the second fastening unit 3b and the fastening unit 3 (second fastening unit 3b) can be locked by interfering with a plunger 5a of the solenoid 5. The extension portion 3bd is composed of a portion formed at the base end portion of the second fastening unit 3b and is capable of abutting on one end of the coil spring 9 described above. The notch portion 3be consists of a notch shape extending in a movement direction in the second fastening unit 3b and the overload prevention portion 15 is slidable on the notch portion 3be. The notch portion 3be has the second abutment surface 3bf which can abut on or be separated from the first abutment surface 15a of the overload prevention portion 15.

Figure 13:
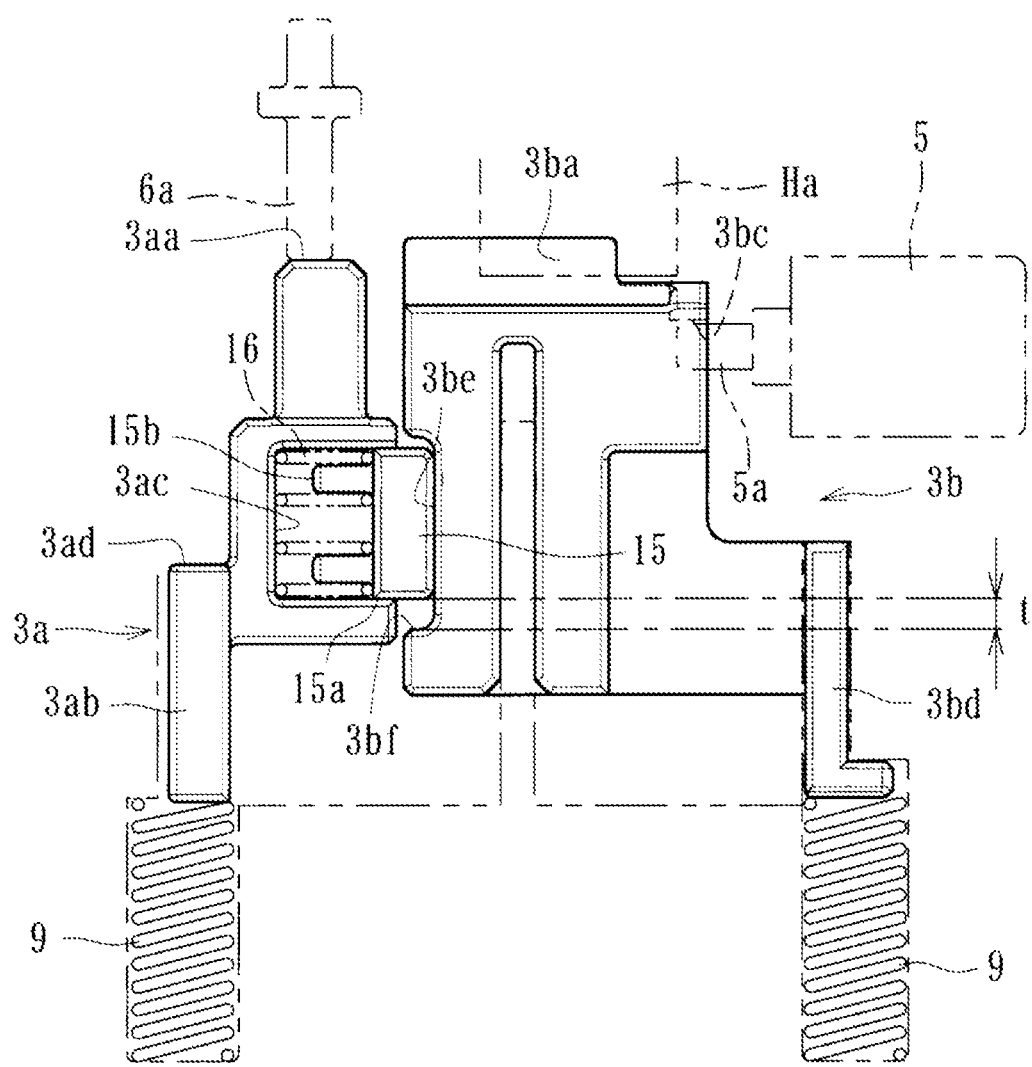
FIG. 13 is a schematic view illustrating the fastening unit (before operation by the operating unit) in the lock device of the fuel tank cap.

However, as illustrated in FIGS. 10 to 12, the first fastening unit 3a and the second fastening unit 3b according to the embodiment are assembled in parallel to the left and right and the overload prevention portion 15 of the first fastening unit 3a is assembled at the notch portion 3be of the second fastening unit 3b. In such an assembled state, as illustrated in FIG. 13, the first abutment surface 15a of the first fastening unit 3a (overload prevention portion 15) and the second abutment surface 3bf of the second fastening unit 3b confront each other and a clearance having a predetermined dimension t is formed between the first abutment surface 15a and the second abutment surface 3bf.

In the embodiment, the lock unit are provided which can lock the movement from the fastening position to the allowing position of the fastening unit 3 or release the lock to allow the movement from the fastening position to the allowing position of the fastening unit 3. Specifically, the lock unit according to the embodiment is composed of the solenoid 5 which can displace the plunger 5a by energization. When the fastening unit 3 (second fastening unit 3b) moves from the fastening position to the allowing position by the swing operation of the operation knob 2, the plunger 5a forms a lock member which can move between an interference position where the lock member interferes with and locks the interfered portion 3bc formed at a predetermined portion of the second fastening unit 3b and a non-interference position where the lock member does not interfere with the interfered portion 3bc and release the lock.

The plunger 5a can be displaced between a protruding state and a contracted state by energization and is set to be an interference position in the protruding state and a non-interference position in the contracted state. The plunger 5a is constantly urged in a direction from the contracted state (non-interference position) to the protruding state (interference position) by a spring (not illustrated) formed inside the solenoid 5. That is, the plunger 5a is brought into a protruding state (interference position) by the urging force of the internal spring in a state where the plunger 5a is not energized and locks the fastening unit 3. When the plunger 5a is energized, the plunger 5a is put into a contracted state (non-interference position) against the urging force of the internal spring and unlocks the fastening unit 3.

That is, in the interfered portion 3bc according to the embodiment, when the cap 1 is in the closed position, if the second fastening unit 3b is to be moved from the fastening position to the allowing position, the plunger 5a at the interference position interferes and regulates and locks the movement toward the allowing position of the second fastening unit 3b. By energizing the solenoid 5, the plunger 5a moves from the interference position to the non-interference position and the lock is released, and thus the second fastening unit 3b is allowed to move toward the allowing position and the lock is released. As a result, the cap 1 can be swung to the open position.

As illustrated in FIGS. 20 to 24, the solenoid 5 according to the embodiment is accommodated in a unit 4 fixed at a predetermined position in the main body R and the plunger 5a is in a state of protruding to the outside of the unit 4. The unit 4 includes a mounting case 10 to which the slider 6 and the detection switch 8 are mounted and the solenoid 5, the slider 6, and the detection switch 8 are integrated parts.

In the embodiment, the unit 4 is equipped with the slider 6 which works with the first fastening unit 3a and the detection switch 8 which can detect the movement of the slider 6. The unit 4 is configured such that the lock release by the solenoid 5 (lock unit) can be performed on condition that the detection switch 8 detects the movement of the slider 6. In particular, as illustrated in FIGS. 20 to 24, the slider 6 and the detection switch 8 are attached to the mounting case 10 forming the unit 4 and the protruding portion 6*a* of the slider 6 is in a state of protruding to the outside of the unit 4. In the drawing, the reference letter f indicates a sealing material for waterproofing.

Figure 23:
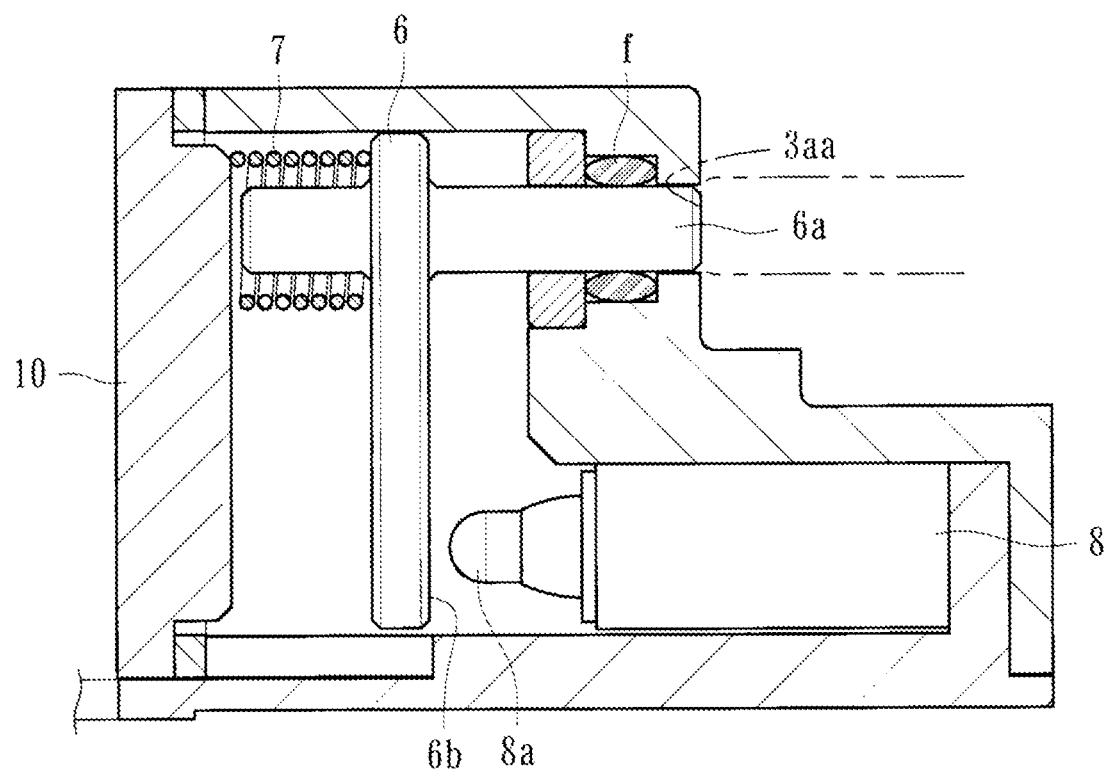
FIG. 23 is a schematic view illustrating a positional relationship between the slider and a detection switch (Off state) in the lock device of the fuel tank cap.
Figure 24:
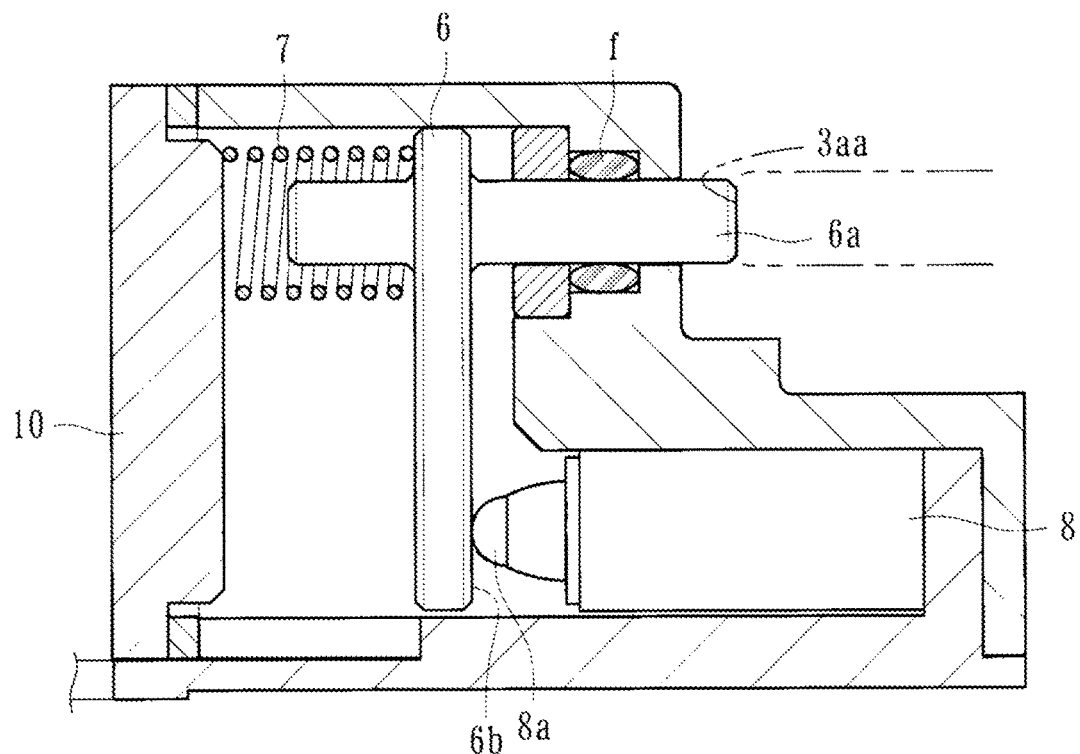
FIG. 24 is a schematic view illustrating a positional relationship between the slider and the detection switch (On state) in the lock device of the fuel tank cap.

The slider 6 is in a state of being urged to the right side in FIGS. 23 and 24 by the coil spring 7 attached to the mounting case 10 and the slider 6 is assembled in a state where the tip of the protruding portion 6*a* abuts on the abutment portion 3*aa* of the fastening unit 3. The slider 6 has a pressing surface 6*b* capable of pressing an operating portion 8*a* of the detection switch 8 at a portion different from the protruding portion 6*a*. It is configured such that, in response to the movement of the slider 6, the pressing surface 6*b* can press the operating portion 8*a* to electrically turn on the detection switch 8 (see FIG. 24) or the pressing surface 6*b* can be separated from the operating portion 8*a* so that the detection switch 8 can be electrically turned off (see FIG. 23).

Then, before operating the operation knob 2, the slider 6 is in a state where the pressing surface 6*b* is separated from the operating portion 8*a* as illustrated in FIG. 23 and the detection switch 8 is electrically turned off. When the operation knob 2 starts to be operated and the first fastening unit 3*a* starts moving, the slider 6 moves in the same direction following the first fastening unit 3*a* by the urging force of the coil spring 7 and the pressing surface 6*b* presses the operating portion 8*a* and the detection switch 8 is electrically turned on. As such, when the detection switch 8 detects the movement of the slider 6 and is turned on electrically, the solenoid 5 is energized and the lock is released. Therefore, by continuing to operate the operation knob 2, the fastening unit 3 (second fastening unit 3*b*) is moved to the allowing position.

Figure 25:
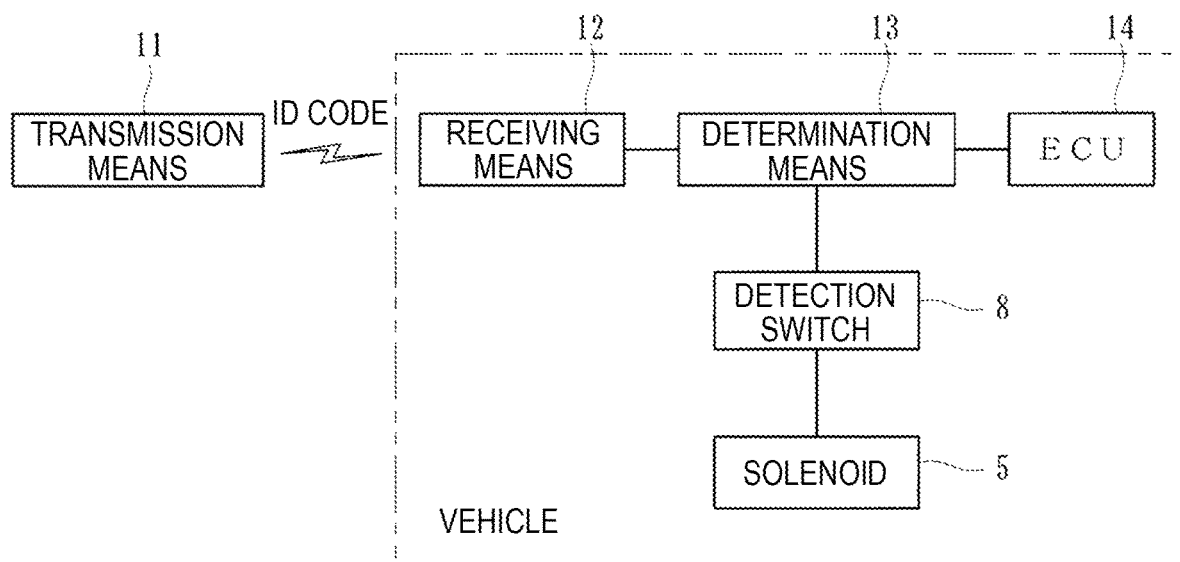
FIG. 25 is a block diagram illustrating an overall configuration of the lock device of the fuel tank cap.

As illustrated in FIG. 25, the vehicle applied to the embodiment includes a transmission unit 11 which can be carried by a driver and transmits a vehicle-specific ID code on radio waves, a receiving unit 12 which is arranged on the vehicle side and capable of receiving the ID code from the transmission unit 11, and a determination unit 13 for determining whether the ID code received by the receiving unit 12 is legitimate in the vehicle. A control signal is transmitted to an ECU 14 to allow the engine to start, provided that the determination unit 13 determines that a legitimate ID code is received.

The determination unit 13 according to the embodiment is electrically connected to the detection switch 8. On condition that the determination unit 13 determines to have received a legitimate ID code and the detection switch 8 detects the start of movement of the first fastening unit 3*a*, the plunger 5*a* of the solenoid 5 is set to the non-interference position in the contracted state, and thus the lock is released. That is, when the determination unit 13 determines to have received the legitimate ID code, the detection switch 8 detects the start of movement of the first fastening unit 3*a*, and therefore, the lock unit performs unlocking by changing the plunger 5*a* of the solenoid 5 from the protruding state (interference position) to the contracted state (non-interference position). When the determination unit 15 does not determine to have received a legitimate ID code, even if the detection switch 8 detects the start of movement of the first fastening unit 3*a*, the plunger 5*a* of the solenoid 5 is maintained in the protruding state (interference position) so that the unlocking operation by the lock unit is not performed.

Next, the operation of the fuel tank cap in the lock device according to the embodiment will be described with reference to FIGS. 13 to 16.

Figure 14:
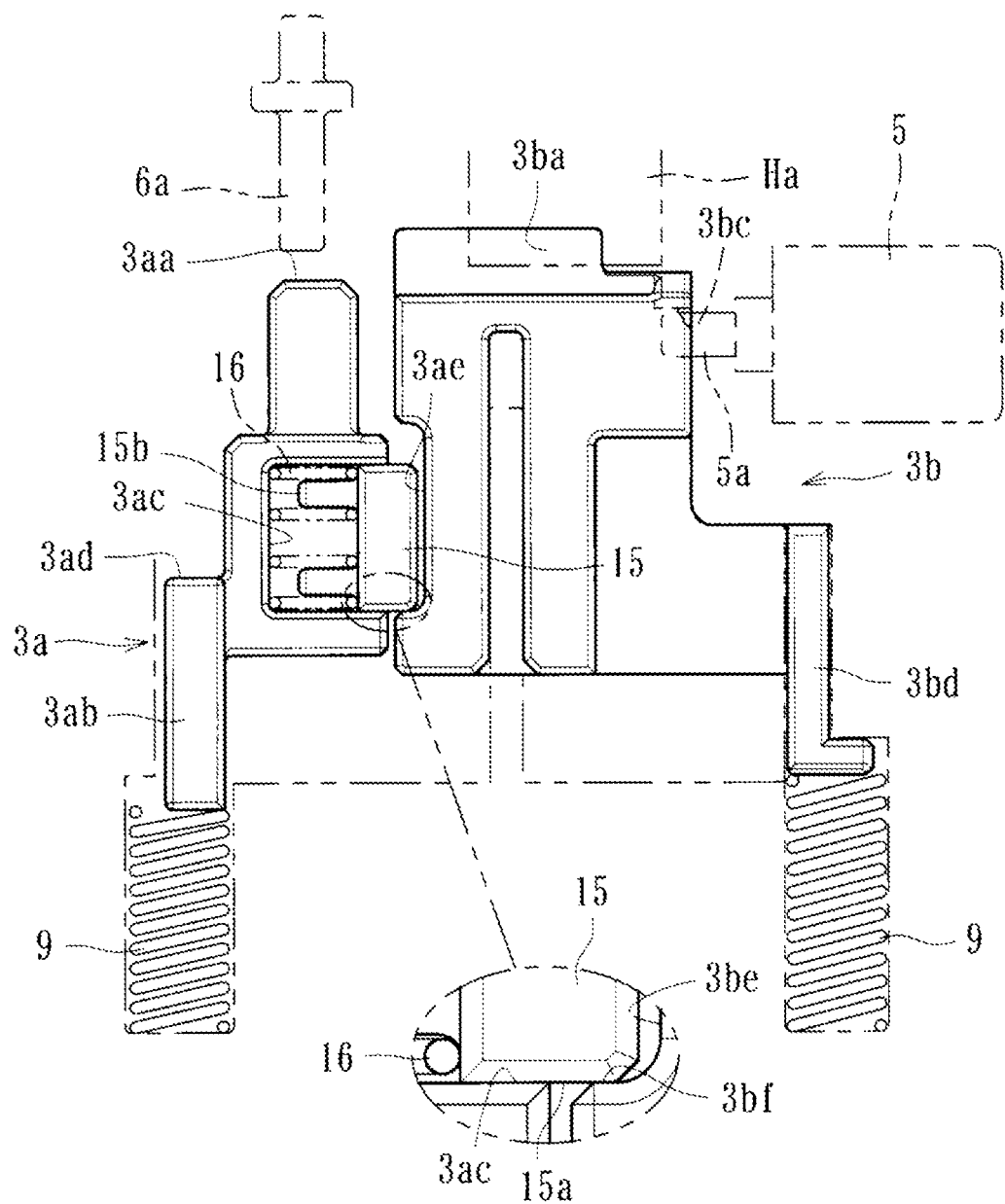
FIG. 14 is a schematic view illustrating the fastening unit (start operation by the operating unit) in the lock device of the fuel tank cap.

When the operation of the operation knob 2 is started, the first fastening unit 3*a* moves downward in FIG. 13, and the overload prevention portion 15 slides along an extension direction of the notch portion 3*be*. Therefore, the first fastening unit 3*a* moves relative to the second fastening unit 3*b* in the stopped state. Due to the movement of the first fastening unit 3*a*, as illustrated in FIG. 14, the protruding portion 6*a* of the slider 6 follows the abutment portion 3*aa* and turns on the detection switch 8. As a result, the detection switch 8 can detect the start of movement of the first fastening unit 3*a*. Therefore, when the legitimate ID code is determined to be received by the determination unit 13, by energizing the solenoid 5, the plunger 5*a* can be moved from the interference position to the non-interference position to release the lock.

Figure 15:
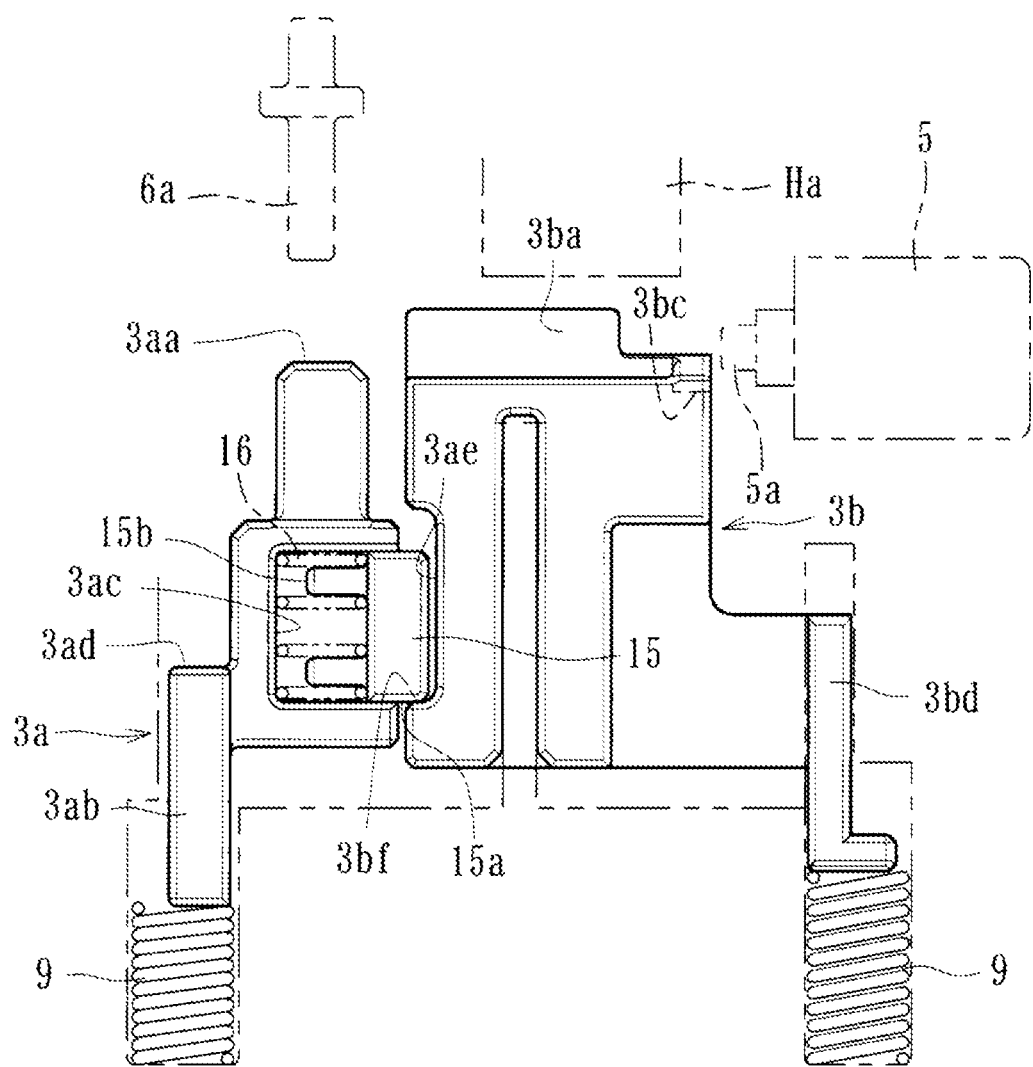
FIG. 15 is a schematic view illustrating the fastening unit (finish operation by the operating unit) in the lock device of the fuel tank cap.

Then, when the first fastening unit 3*a* moves by a predetermined dimension t, as illustrated in FIG. 14, the first abutment surface 15*a* of the overload prevention portion 15 abuts on the second abutment surface 3*bf*. Therefore, by continuously operating the operation knob 2, as illustrated in FIG. 15, the first fastening unit 3*a* and the second fastening unit 3*b* move integrally and the second fastening unit 3*b* moves from the fastening position to the allowing position. It is possible to swing the cap 1 to the open position.

Figure 16:
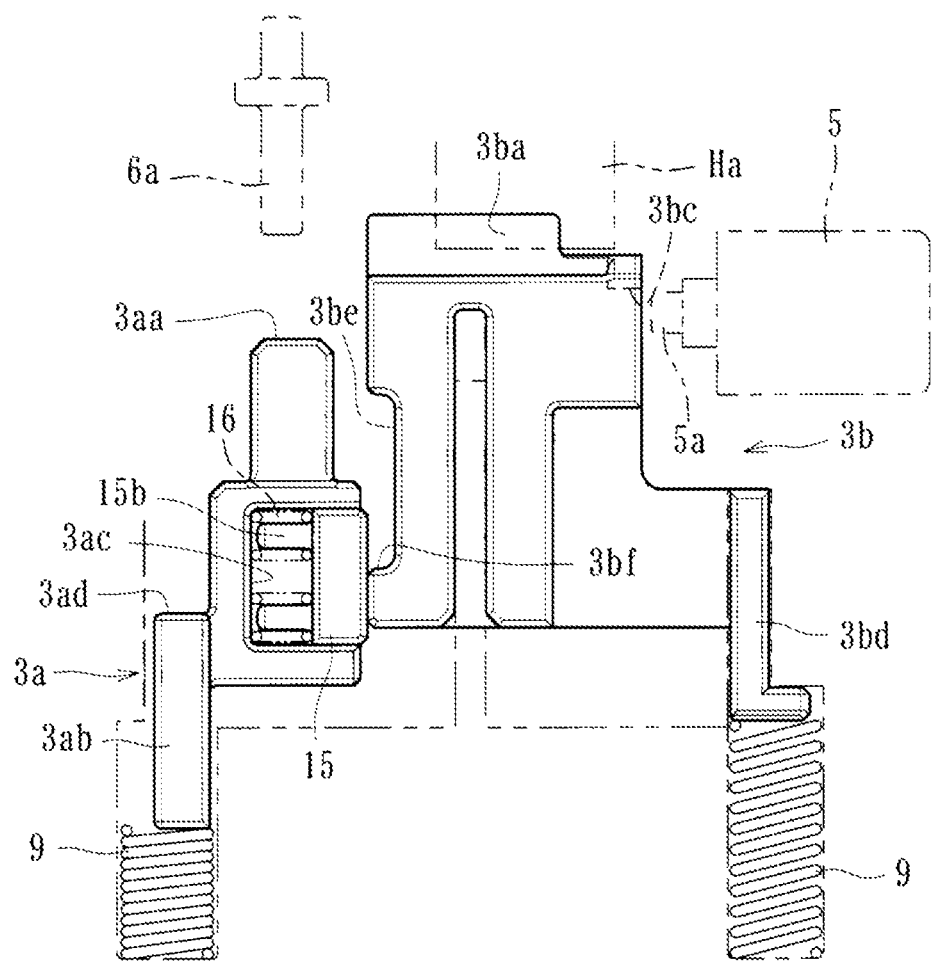
FIG. 16 is a schematic view illustrating the fastening unit (when an overload occurs in an operation process by the operating unit) in the lock device of the fuel tank cap.
Figure 17:
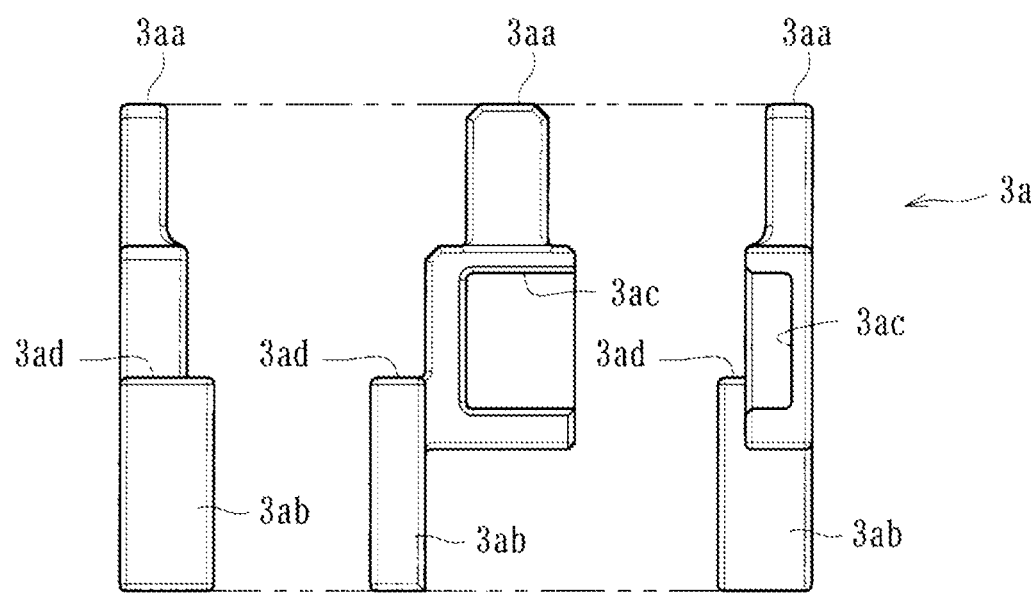
FIG. 17 is a three-side view illustrating the first fastening unit in the lock device of the fuel tank cap.

On the other hand, in the process of moving the first fastening unit 3*a* accompanying the operation of the operation knob 2, for example, when a foreign substance intervenes between the fastening portion 3*ba* and the fastened portion Ha and the second fastening unit 3*b* malfunctions, or when an overload occurs, such as when the plunger 5*a* of the solenoid 5 is in the interference position, as illustrated in FIG. 16, the overload prevention portion 15 moves to the left side of the drawing against the urging force of the coil spring 16 to avoid abutment between the first abutment surface 15*a* and the second abutment surface 3*bf*. As a result, the first fastening unit 3*a* moves relative to the second fastening unit 3*b* and the stopped state of the second fastening unit 3*b* is maintained. Therefore, the operating force received in the first fastening unit 3*a* is not transmitted to the second fastening unit 3*b*.

Next, a lock device of a fuel tank cap according to the second embodiment of the invention will be described.

The lock device for the fuel tank cap according to the second embodiment locks or unlocks the opening and closing of a cap for blocking the fuel filler port connected to a fuel tank in a large two-wheeled vehicle, as in the first embodiment. Except for the fastening unit 3, the same components are configured as those in the first embodiment. The same components and parts as those in the first embodiment are designated by the same reference numerals and letters and detailed description thereof will be omitted.

Figure 26:
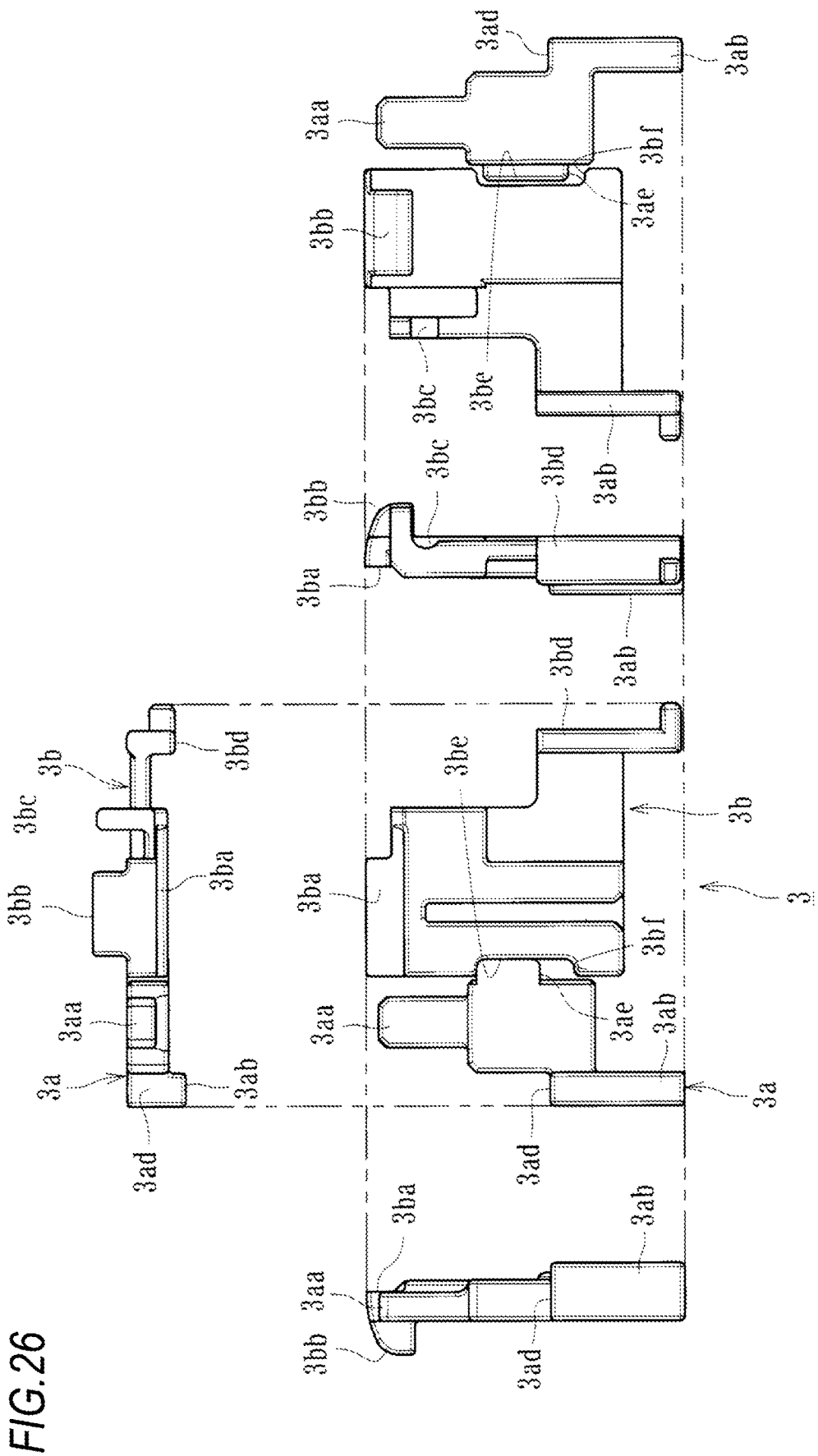
FIG. 26 is a five-side view illustrating a fastening unit (a state in which a first fastening unit and a second fastening unit are integrated) in a lock device of a fuel tank cap according to a second embodiment of the invention.
Figure 27:
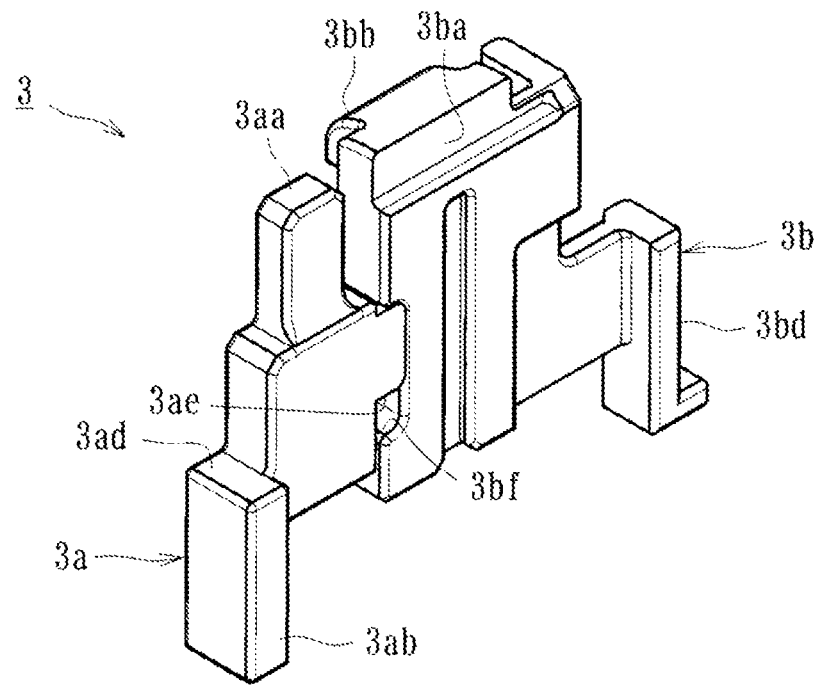
FIG. 27 is a perspective view illustrating the fastening unit (a state in which the first fastening unit and the second fastening unit are integrated)
Figure 28:
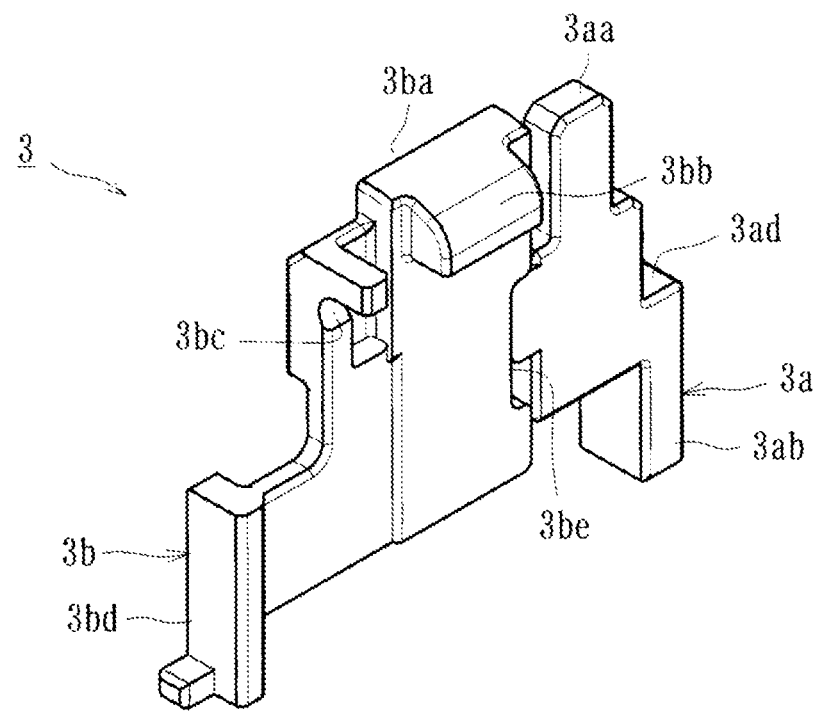
FIG. 28 is a perspective view illustrating the fastening unit (a state in which the first fastening unit and the second fastening unit are integrated)

As illustrated in FIGS. 26 to 28, the fastening unit 3 according to the embodiment is configured to include the first fastening unit 3*a* and the second fastening unit 3*b*. The first fastening unit 3*a* and second fastening unit 3*b* consist of separate members. The first fastening unit 3*a* and the second fastening unit 3*b* can be moved integrally, or the first fastening unit 3*a* can be moved separately against the second fastening unit 3*b*. As illustrated in FIGS. 4 and 5, the first fastening unit 3*a* and the second fastening unit 3*b* are urged from the allowing position toward the fastening position by the urging forces of the coil springs 9.

Figure 32:
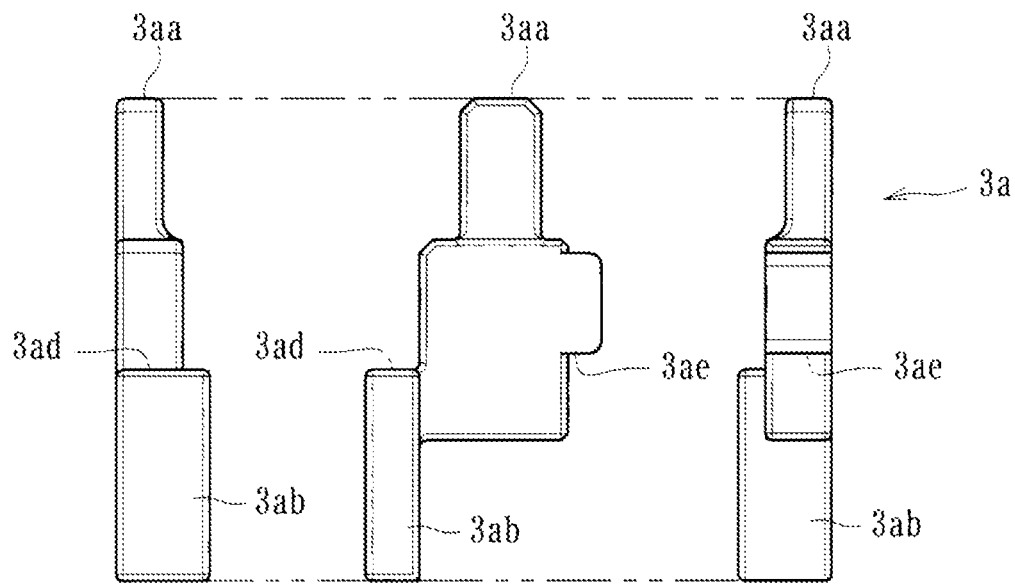
FIG. 32 is a three-side view illustrating the first fastening unit in the lock device of the fuel tank cap.

The first fastening unit 3a moves by receiving the operating force of the operation knob 2 (operating unit) and the start of movement thereof can be detected by the detection switch 8. Therefore, as illustrated in FIG. 32, the first fastening unit 3a includes the abutment portion 3aa, the extension portion 3ab, the receiving portion 3ad, and a first abutment surface 3ae. The first abutment surface 3ae consists of a surface of the protruding portion formed on a side of the first fastening unit 3a. As illustrated in FIGS. 26 to 28, the first fastening unit 3a and the second fastening unit 3b are assembled so that the protruding portion can slide in the notch portion 3be of the second fastening unit 3b.

However, as illustrated in FIGS. 26 to 28, the first fastening unit 3a and the second fastening unit 3b according to the embodiment are assembled in parallel on the left and right sides and the protruding portion where the first abutment surface 3ae is formed is located at the notch portion 3be of the second fastening unit 3b and is assembled. In such an assembled state, as illustrated in FIG. 29, the first abutment surface 3ae of the first fastening unit 3a and the second abutment surface 3bf of the second fastening unit 3b confront each other and a clearance having a predetermined dimension t is formed between the first abutment surface 3ae and the second abutment surface 3bf.

Next, the operation of the lock device of the fuel tank cap according to the embodiment will be described with reference to FIGS. 29 to 31.

Figure 29:
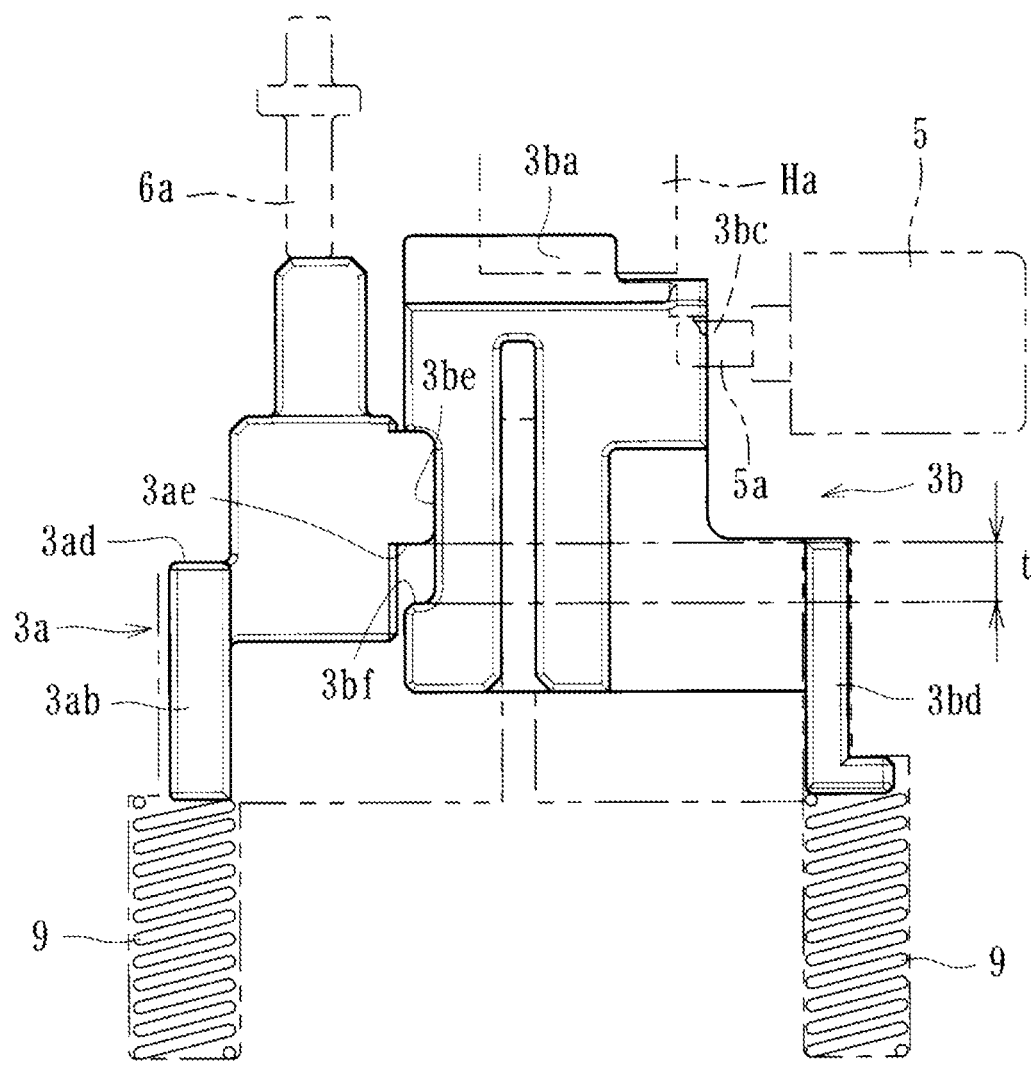
FIG. 29 is a schematic view illustrating the fastening unit (before operation by an operating unit) in the lock device of the fuel tank cap.

When the operation of the operation knob 2 is started, the first fastening unit 3a moves downward in FIG. 29, and the protruding portion where the first abutment surface 3ae is formed slides along the extending direction of the notch portion 3be and the first fastening unit 3a moves relative to the second fastening unit 3b in the stopped state. Due to the movement of the first fastening unit 3a, as illustrated in FIG. 30, the protruding portion 6a of the slider 6 follows the abutment portion 3aa and turns on the detection switch 8. As a result, the detection switch 8 can detect the start of movement of the first fastening unit 3a. Therefore, when the determination unit 13 determines that a legitimate ID code has been received, the plunger 5a can be moved from the interference position to the non-interference position and unlocked by energizing the solenoid 5.

Figure 30:
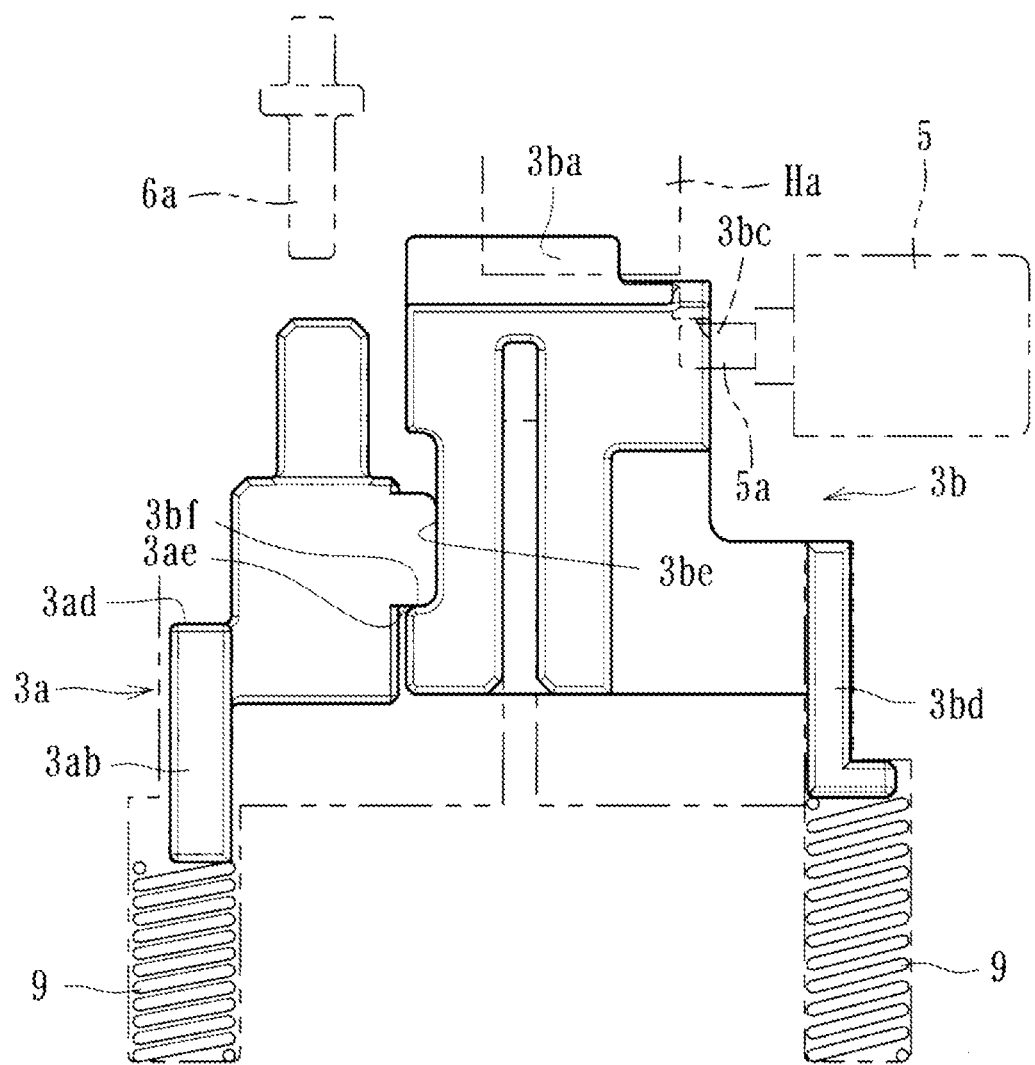
FIG. 30 is a schematic view illustrating the fastening unit (start operation by the operating unit) in the lock device of the fuel tank cap.
Figure 31:
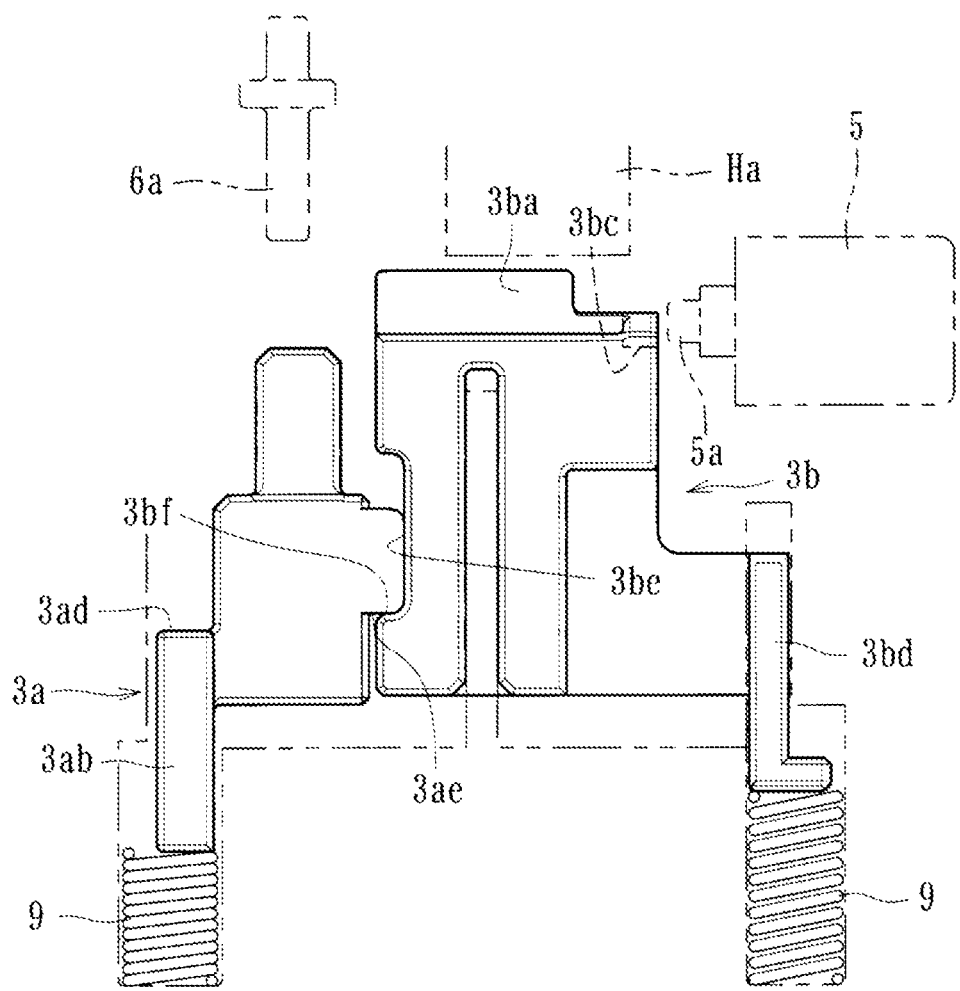
FIG. 31 is a schematic view illustrating the fastening unit (finish operation by the operating unit) in the lock device of the fuel tank cap.

Then, when the first fastening unit 3a moves by the predetermined dimension t, as illustrated in FIG. 30, the first abutment surface 3ae abuts on the second abutment surface 3bf. Therefore, by continuously operating the operation knob 2, as illustrated in FIG. 31, the first fastening unit 3a and the second fastening unit 3b move integrally and the second fastening unit 3b moves from the fastening position to the allowing position. It is possible to swing the cap 1 to the open position.

According to the first and second embodiments, the fastening unit 3 includes the first fastening unit 3a which moves by receiving the operating force of the operation knob 2 (operating unit) and of which the start of movement can be detected by the detection switch 8 and the second fastening unit 3b which enables locking by the solenoid 5 (lock unit) and which is integrally moved with the first fastening unit 3a after the first fastening unit 3a is moved by the predetermined dimension t so that the second fastening unit 3b can be moved from the fastening position to the allowing position. Therefore, a sufficient time can be secured from the detection of the start of movement of the fastening unit 3 by the detection switch 8 until the unlocking by the solenoid 5, and thus the operability by the operation knob 2 can be improved.

According to the first and second embodiments, by the abutment between the first abutment surface (15a, 3ae) formed in the first fastening unit 3a and the second abutment surface 3bf formed in the second fastening unit 3b, the first fastening unit 3a and the second fastening unit 3b can be moved integrally. Since a clearance of the predetermined dimension t is formed between the first abutment surface (15a, 3ae) and the second abutment surface 3bf, with a simple configuration, it is possible to secure a sufficient time from the detection of the movement start of the fastening unit 3 by the detection switch 8 until the unlocking by the solenoid 5.

The first abutment surface 15a (or the second abutment surface 3bf) according to the first embodiment is formed in the overload prevention portion 15 for releasing a load when the load exceeding a predetermined value is generated in the process of integrally moving the first fastening unit 3a and the second fastening unit 3b. Therefore, it is possible to prevent the device from being damaged due to an overload generated in the operation process of the operation knob 2 (operating unit).

Such an overload prevention portion 15 integrally moves the first fastening unit 3a and the second fastening unit 3b when a load exceeding a predetermined value does not occur in the operation process of the operation knob 2, and when a load exceeding a predetermined value is generated, the operating force received in the first fastening unit 3a is not transmitted to the second fastening unit 3b. As a result, it is possible to reliably release the overload generated in the operation process of the operation knob 2 and more reliably prevent damage to the device.

According to the first and second embodiments, it is provided with the transmission unit 11 which can be carried by a driver and transmits a vehicle-specific ID code, the receiving unit 12 which is arranged on the vehicle side and capable of receiving the ID code from the transmission unit 11, and the determination unit 13 for determining whether the ID code received by the receiving unit 12 is legitimate in the vehicle. Since the lock is released by the solenoid 5 (lock unit) on the condition that it is determined that a legitimate ID code has been received by the determination unit 13 and the start of the movement of the first fastening unit 3a is detected, the operability of the operation knob 2 can be improved while improving the crime prevention effect.

According to the first and second embodiments, since unlocking by the lock unit is performed on the condition that a legitimate ID code is determined to be received by the determination unit 13 and the movement of the second fastening unit 3b is detected, the lock can be unlocked in the process of operating the operation knob 2. As a result, for example, the operability can be improved as compared with a case in which the lock is released by a separate operating unit (access switch or the like) attached to the vehicle side.

Although the embodiments are described above, the invention is not limited thereto, and for example, the lock unit is not limited to the solenoid 5 and may be another actuator or the like. In the embodiment, the solenoid 5 as lock unit, the slider 6 and the detection switch 8 are integrated as a component with the unit 4, but the slider 6 and the detection switch 8 may be separately arranged without the unit 4. In the first and second embodiments, although the movement of the fastening unit 3 is detected by the detection switch 8 via the slider 6, the movement of fastening unit 3 may be directly detected by the detection switch 8.

The overload prevention unit 15 according to the first embodiment is accommodated in the accommodation recess portion 3ac while being urged by the coil spring 16. However, other configurations (for example, one having different an urging unit from the coil spring 16 or one having a connecting force of the first fastening unit 3a and the second fastening unit 3b exclusively by frictional force) may be used. The applicable vehicle may be an automobile, a motorcycle, a buggy, a snow vehicle, or the like.

The fastening unit can be applied to a lock device of a fuel tank cap having a different appearance or having other functions added, as long as the lock device includes a first fastening unit which moves by receiving an operating force of an operating unit and of which the start of the movement can be detected by a detection switch and a second fastening unit which can be locked by a lock unit and is such that after the first fastening unit moves by a predetermined dimension, the second fastening unit moves integrally with the first fastening unit to move from the fastening position to the allowing position.

According to an aspect of the invention, there is provided a lock device of a fuel tank cap including: a cap configured to open and close a fuel filler port by moving between a closed position where the fuel filler port leading to a fuel tank of a vehicle is blocked and an open position where the fuel filler port is open; an operating unit configured to be operated by an operator; a fastening unit movable in conjunction with an operation of the operating unit, the fastening unit configured to move between a fastening position where the cap blocking the fuel filler port is held and an allowing position where the fastening is released to allow the cap to open; a lock unit configured to lock movement of the fastening unit from the fastening position to the allowing position or release the lock to allow the movement of the fastening unit from the fastening position to the allowing position; and a detection switch configured to detect start of the movement of the fastening unit accompanying the operation of the operating unit, where: the lock device performs unlocking by the lock unit on condition that the detection switch detects the start of the movement of the fastening unit; and the fastening unit includes: a first fastening unit which moves by receiving an operating force of the operating unit and of which the start of movement can be detected by the detection switch; and a second fastening unit which enables locking by the lock unit and which is integrally moved with the first fastening unit after the first fastening unit is moved by a predetermined dimension so that the second fastening unit can be moved from the fastening position to the allowing position.

According to the above aspect of the invention, the fastening unit includes the first fastening unit which moves by receiving the operating force of the operating unit and of which the start of movement can be detected by the detection switch and the second fastening unit which enables locking by the lock unit and which is integrally moved with the first fastening unit after the first fastening unit is moved by the predetermined dimension so that the second fastening unit can be moved from the fastening position to the allowing position. Therefore, a sufficient time can be secured from the detection of the start of movement of the fastening unit by the detection switch until the unlocking by the lock unit, and thus the operability by the operating unit can be improved.

The first fastening unit and the second fastening unit may be configured to be moved integrally by making a first abutment surface formed in the first fastening unit abut on a second abutment surface formed in the second fastening unit and a clearance of a predetermined dimension is formed between the first abutment surface and the second abutment surface.

In this case, by the abutment between the first abutment surface formed in the first fastening unit and the second abutment surface formed in the second fastening unit, the first fastening unit and the second fastening unit can be moved integrally. Since a clearance of the predetermined dimension is formed between the first abutment surface and the second abutment surface, with a simple configuration, it is possible to secure a sufficient time from the detection of the movement start of the fastening unit by the detection switch until the unlocking by the lock unit.

The first abutment surface or the second abutment surface may be formed in an overload prevention portion for releasing a load when the load exceeding a predetermined value is generated in a process of integrally moving the first fastening unit and the second fastening unit.

In this case, the first abutment surface or the second abutment surface is formed in the overload prevention portion for releasing a load when the load exceeding a predetermined value is generated in the process of integrally moving the first fastening unit and the second fastening unit. Therefore, it is possible to prevent a device from being damaged due to an overload generated in the operation process of the operating unit.

The overload prevention portion may be configured such that the first fastening unit and the second fastening unit are integrally moved when the load exceeding the predetermined value does not occur in an operating process of the operating unit and an operating force received by the first fastening unit is not transmitted to the second fastening unit when the load exceeding the predetermined value is generated.

In this case, the overload prevention portion integrally moves the first fastening unit and the second fastening unit when a load exceeding a predetermined value does not occur in the operation process of the operating unit, and when a load exceeding a predetermined value is generated, the operating force received in the first fastening unit is not transmitted to the second fastening unit. As a result, it is possible to reliably release the overload generated in the operation process of the operating unit and more reliably prevent damage to the device.

The lock device may further include: a transmission unit that a driver can carry and transmit a vehicle-specific ID code; a receiving unit which is arranged on a vehicle side and is configured to receive the ID code from the transmission unit; and a determination unit to determine whether the ID code received by the receiving unit is legitimate in the vehicle, and the lock unit may release the lock on the condition that the legitimate ID code is determined to be received by the determination unit and the start of movement of the first fastening unit is detected.

In this case, the lock device includes the transmission unit which can be carried by a driver and transmits a vehicle-specific ID code, the receiving unit which is arranged on the vehicle side and capable of receiving the ID code from the transmission unit, and the determination unit for determining whether the ID code received by the receiving unit is legitimate in the vehicle. Since the lock is released by the lock unit on the condition that it is determined that a legitimate ID code has been received by the determination unit and the start of the movement of the first fastening unit is detected. As a result, the operability of the operating unit can be improved while improving the crime prevention effect.

The invention claimed is:

1. A lock device of a fuel tank cap comprising:
   a cap configured to open and close a fuel filler port by moving between a closed position where the fuel filler port leading to a fuel tank of a vehicle is blocked and an open position where the fuel filler port is open;
   an operating unit configured to be operated by an operator;
   a fastening unit movable in conjunction with an operation of the operating unit, the fastening unit configured to move between a fastening position where the cap blocking the fuel filler port is held and an allowing position where the fastening is released to allow the cap to open;
   a lock unit configured to lock movement of the fastening unit from the fastening position to the allowing position or release the lock to allow the movement of the fastening unit from the fastening position to the allowing position; and
   a detection switch configured to detect start of the movement of the fastening unit accompanying the operation of the operating unit, wherein:
   the lock device performs unlocking by the lock unit on condition that the detection switch detects the start of the movement of the fastening unit; and
   the fastening unit includes:
      a first fastening unit which moves by receiving an operating force of the operating unit and of which the start of movement can be detected by the detection switch; and
      a second fastening unit which enables locking by the lock unit and which is integrally moved with the first fastening unit after the first fastening unit is moved by a predetermined dimension so that the second fastening unit can be moved from the fastening position to the allowing position.

2. The lock device of the fuel tank cap according to claim 1, wherein
   the first fastening unit and the second fastening unit is configured to be moved integrally by making a first abutment surface formed in the first fastening unit abut on a second abutment surface formed in the second fastening unit and a clearance of a predetermined dimension is formed between the first abutment surface and the second abutment surface.

3. The lock device of the fuel tank cap according to claim 2, wherein
   the first abutment surface or the second abutment surface is formed in an overload prevention portion for releasing a load when the load exceeding a predetermined value is generated in a process of integrally moving the first fastening unit and the second fastening unit.

4. The lock device of the fuel tank cap according to claim 3, wherein
   the overload prevention portion is configured such that the first fastening unit and the second fastening unit are integrally moved when the load exceeding the predetermined value does not occur in an operating process of the operating unit and an operating force received by the first fastening unit is not transmitted to the second fastening unit when the load exceeding the predetermined value is generated.

5. The lock device of the fuel tank cap according to claim 1, further comprising:
   a transmission unit that a driver can carry and transmit a vehicle-specific ID code;
   a receiving unit which is arranged on a vehicle side and is configured to receive the ID code from the transmission unit; and
   a determination unit to determine whether the ID code received by the receiving unit is legitimate in the vehicle, wherein
   the lock unit releases the lock on the condition that the legitimate ID code is determined to be received by the determination unit and the start of movement of the first fastening unit is detected.

* * * * *